US008897174B2

(12) United States Patent
Komarevtsev

(10) Patent No.: US 8,897,174 B2
(45) Date of Patent: Nov. 25, 2014

(54) NETWORK CONFIGURATION MANAGEMENT

(75) Inventor: Anton Vladimirovich Komarevtsev, Moscow (RU)

(73) Assignee: Netcracker Technology Corp., Waltham, MA (US)

(*) Notice: Subject to any disclaimer, the term of this patent is extended or adjusted under 35 U.S.C. 154(b) by 296 days.

(21) Appl. No.: 13/496,802

(22) PCT Filed: Sep. 18, 2009

(86) PCT No.: PCT/RU2009/000481
§ 371 (c)(1),
(2), (4) Date: May 1, 2012

(87) PCT Pub. No.: WO2011/034457
PCT Pub. Date: Mar. 24, 2011

(65) Prior Publication Data
US 2012/0218917 A1  Aug. 30, 2012

(51) Int. Cl.
H04L 12/28 (2006.01)
H04L 12/24 (2006.01)

(52) U.S. Cl.
CPC .................. H04L 41/0843 (2013.01)
USPC ............ 370/255; 370/252; 370/254; 709/210

(58) Field of Classification Search
CPC ....................................... H04L 41/08
USPC ...................... 370/254–256, 252; 709/210
See application file for complete search history.

(56) References Cited

U.S. PATENT DOCUMENTS

| 7,684,354 | B2* | 3/2010 | Tamboise et al. ............. 370/255 |
| 7,774,440 | B1* | 8/2010 | Bagrodia et al. ............. 709/221 |
| 2004/0172412 | A1 | 9/2004 | Files et al. |
| 2006/0190575 | A1* | 8/2006 | Harvey et al. ................. 709/222 |
| 2009/0041026 | A1 | 2/2009 | Hu et al. |
| 2010/0128639 | A1* | 5/2010 | Dehaan et al. ................ 370/255 |
| 2010/0131625 | A1* | 5/2010 | Dehaan et al. ................ 709/221 |
| 2013/0185401 | A1* | 7/2013 | Ajiro et al. .................... 709/220 |

OTHER PUBLICATIONS

International Search Report for PCT/RU2009/000481; issued Nov. 8, 2010; 2 pgs.

* cited by examiner

Primary Examiner — Christopher Grey
(74) Attorney, Agent, or Firm — Foley & Lardner LLP

(57) ABSTRACT

Described are computer-based methods and apparatuses, including computer program products, for network configuration management. In some examples, a network configuration management system generates a difference network configuration for a managed network and identifies a network change case from the difference network configuration. The network configuration management system can further select a network change case application template and select a configuration file template. The network configuration management system can further generate device configuration file for a network device and store the device configuration file. In other examples, the network configuration management system generates device configuration files for a plurality of network devices.

41 Claims, 32 Drawing Sheets

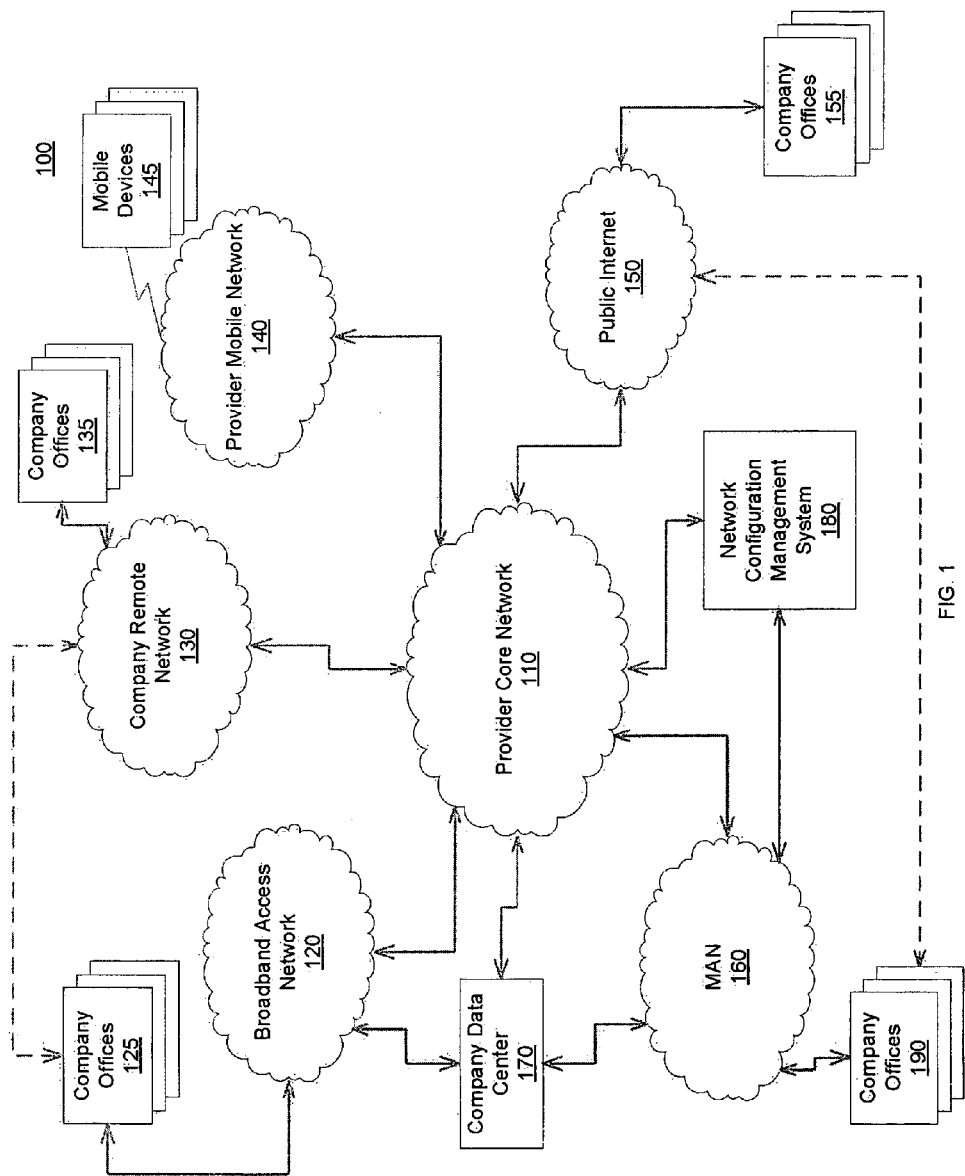

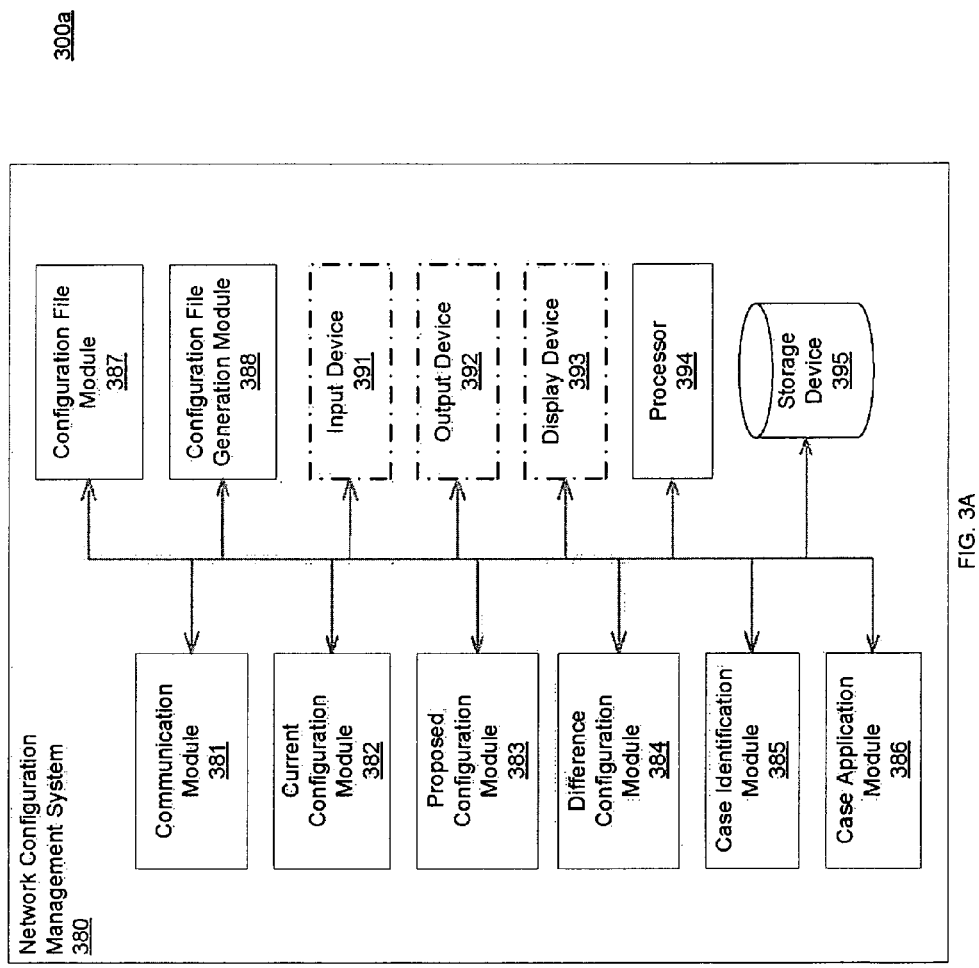

```
<apply-case-template casename="ISDN Backup">
  <do rolename="A-End Device" action="activate" template="Cisco ISDN">
    <set-parameter name="Network Element">
      <get-parameter name="object_id" />
    </set-parameter>
    <set-parameter name="BRI Interface">
      <get-parameter rolename="A-End Interface" name="object_id" />
    </set-parameter>
    <set-parameter name="Remote Network Element">
      <get-parameter rolename="Z-End Device" name="object_id" />
    </set-parameter>
    <set-parameter name="Remote BRI Interface">
      <get-parameter rolename="Z-End Interface" name="object_id" />
    </set-parameter>
    <set-parameter name="ISDN Connection">
      <get-parameter rolename="ISDN Backup Circuit" name="object_id" />
    </set-parameter>
  </do>                                                                    } 512f
  <do rolename="Z-End Device" action="activate" template="Cisco ISDN">
    <set-parameter name="Network Element">
      <get-parameter name="object_id" />
    </set-parameter>
    <set-parameter name="BRI Interface">
      <get-parameter rolename="Z-End Interface" name="object_id" />
    </set-parameter>
    <set-parameter name="Remote Network Element">
      <get-parameter rolename="A-End Device" name="object_id" />
    </set-parameter>
    <set-parameter name="Remote BRI Interface">
      <get-parameter rolename="A-End Interface" name="object_id" />
    </set-parameter>
    <set-parameter name="ISDN Connection">
      <get-parameter rolename="ISDN Backup Circuit" name="object_id" />
    </set-parameter>
  </do>                                                                    } 514f
</apply-case-template>
```

```
isdn switch-type basic-dms100 interface <%=BRI Interface.name%>
ip address <%=BRI Interface.IP Address%> <%=BRI Interface.Subnet Mask%>
isdn spid1 <%=BRI Interface.SPID 1%>
isdn spid2 <%=BRI Interface.SPID 2%> encapsulation PPP
ppp authentication chap
<% if (ISDN Connection.Connection Speed != 64)
    print("bandwidth " + ISDN Connection.Connection Speed) %> dialer idle-timeout <%=BRI Interface.Interface Idle Timeout%>
dialer map IP <%=Remote BRI Interface.IP Address%>
     name <%=Remote Network Element.name%> speed <%ISDN Connection.Connection Speed%>
dialer-group 1 dialer-list 1 protocol ip permit
```

FIG. 5G

Remote Router Configuration 500h

```
isdn switch-type basic-dms100 interface Bri0
ip address 131.108.157.1 255.255.255.0
isdn spid1 41598488501 9884885
isdn spid2 41598488602 9884886 encapsulation PPP
ppp authentication chap
bandwidth 56 dialer idle-timeout 300
dialer map IP 131.108.157.2 name main speed 56
dialer-group 1 dialer-list 1 protocol ip permit
```

FIG. 5H

Main Router Configuration 500i

```
isdn switch-type basic-dms100 interface Bri0
ip address 131.108.157.2 255.255.255.0
isdn spid1 41598488201 9884882
isdn spid2 41598488302 9884883 encapsulation PPP
ppp authentication chap
bandwidth 56 dialer idle-timeout 300
dialer map IP 131.108.157.1 name branch1 speed 56
dialer-group 1 dialer-list 1 protocol ip permit
```

612b
```
<case-template casename="New Cell Relation">
  <role rolename="Source Cell" cardinality="1">
    <matching-rule algorithm="equals">
      <parameter name="type">Cell</parameter>
    </matching-rule>
    <matching-rule algorithm="equals">
      <parameter name="object_id"/>
    </matching-rule>
  </role>
```

614b
```
  <role rolename="Destination Cell" cardinality="1">
    <matching-rule algorithm="equals">
      <parameter name="type">Cell</parameter>
    </matching-rule>
    <matching-rule algorithm="equals">
      <parameter name="object_id"/>
      <get-parameter rolename="Destination Cell" name="object_id"/>
      </parameter>
    </matching-rule>
  </role>
```

616b
```
  <role rolename="Direct Relation" cardinality="1">
    <matching-rule algorithm="equals">
      <parameter name="type">Cell Relation</parameter>
    </matching-rule>
    <matching-rule algorithm="equals">
      <parameter name="Source Cell"/>
      <get-parameter rolename="Source Cell" name="object_id"/>
      </parameter>
      <parameter name="Destination Cell"/>
      <get-parameter rolename="Destination Cell" name="object_id"/>
      </parameter>
    </matching-rule>
  </role>
```

618b
```
  <role rolename="Back Relation" cardinality="0..1">
    <matching-rule algorithm="equals">
      <parameter name="type">Cell Relation</parameter>
    </matching-rule>
    <matching-rule algorithm="equals">
      <parameter name="Source Cell"/>
      <get-parameter rolename="Destination Cell" name="object_id"/>
      </parameter>
      <parameter name="Destination Cell"/>
      <get-parameter rolename="Source Cell" name="object_id"/>
      </parameter>
    </matching-rule>
  </role>
</case-template>
```

```
<apply-case-template casename="New Cell Relation">
    <do rolename="Direct Relation" action="activate" template="New Ericsson Cell Relation">
        <set-parameter name="Cell Relation">
            <parameter name="object_id" />
        </set-parameter>
    </do>                                                                                      ⎬ 612c
    <do rolename="Back Relation" action="create" duplicate="no">
        <set-parameter name="parent_id">
            <get-parameter rolename="Direct Relation" name="parent_id" />
        </set-parameter>
        <set-parameter name="Source Cell">
            <get-parameter rolename="Destination Cell" name="object_id" />
        </set-parameter>
        <set-parameter name="Destination Cell">
            <get-parameter rolename="Source Cell" name="object_id" />
        </set-parameter>
    </do>                                                                                      ⎬ 614c
    <do rolename="Back Relation" action="activate" template="New Ericsson Cell Relation">
        <set-parameter name="Cell Relation">
            <parameter name="object_id" />
        </set-parameter>
    </do>                                                                                      ⎬ 616c
</apply-case-template>
```

FIG. 6C

| Envelope Section | Structure |
|---|---|
| Header (622d) | `<?xml version="1.0" encoding="UTF-8"?>`<br>`<bulkCmConfigDataFile xmlns="configData.xsd"`<br>`    xmlns:xn="genericNrm.xsd"`<br>`    xmlns:un="utranNrm.xsd" xmlns:gn="geranNrm.xsd"`<br>`    xmlns:es="EricssonSpecificAttributes.4.7.xsd">`<br>`<fileHeader fileFormatVersion="32.615 V4.5" vendorName="Ericsson" />`<br>`<configData dnPrefix="">`<br>`    <xn:SubNetwork id="B1">`<br>`    <xn:SubNetwork id="B1">`<br>`        <xn:MeContext id="<RNC name>">`<br>`            <xn:ManagedElement id="<ME Id>">`<br>`                <un:RncFunction id="<Function Id>">` |
| Content for External GSM Cell (624d) | `<gn:ExternalGsmCell id="<GSM Cell name>" modifier="create">`<br>`<gn:attributes>`<br>`<gn:userLabel><GSM Cell name></gn:userLabel>`<br>`< list of GSM attributes >`<br>`</gn:attributes>`<br>`<xn:VsDataContainer id="<GSM Cell name>" modifier="create">`<br>`<xn:attributes>`<br>`<xn:vsDataType>vsDataExternalGsmCell</xn:vsDataType>`<br>`<es:vsDataExternalGsmCell>`<br>`<list of vendor specific attributes>`<br>`</es:vsDataExternalGsmCell>`<br>`<xn:vsDataFormatVersion>EricssonSpecificAttributes.4.7</xn:vsDataFormatVersion>`<br>`</xn:attributes>`<br>`</xn:VsDataContainer>`<br>`</gn:ExternalGsmCell>` |
| Content for UTRAN Cell (626d) | `<un:UtranCell id="<UMTS Cell name>">`<br>`<gn:GsmRelation id="<Relation Id>" modifier = "create">`<br>`<gn:attributes>`<br>`<gn:adjacentCell>SubNetwork=A1=<GSM Cell name></gn:adjacentCell>`<br>`</gn:attributes>`<br>`<xn:VsDataContainer id="<Relation Id>">`<br>`<xn:attributes>`<br>`<xn:vsDataType>vsDataGsmRelation</xn:vsDataType>`<br>`<xn:vsDataFormatVersion>EricssonSpecificAttributes.4.7</xn:vsDataFormatVersion>`<br>`<es:vsDataGsmRelation>`<br>`<list of vendor specific attributes>`<br>`</es:vsDataGsmRelation>`<br>`</xn:attributes>`<br>`</xn:VsDataContainer>`<br>`</gn:GsmRelation>`<br>`</un:UtranCell>` |
| Footer (628d) | `</un:RncFunction>`<br>`</xn:ManagedElement>`<br>`</xn:MeContext>`<br>`</xn:SubNetwork>`<br>`</xn:SubNetwork>`<br>`</configData>`<br>`<fileFooter dateTime="<current date and time>" />`<br>`</bulkCmConfigDataFile>` |

```xml
<?xml version="1.0" encoding="UTF-8" ?>
<bulkCmConfigDataFile xmlns="configData.xsd" xmlns:xn="genericNrm.xsd" xmlns:un="utranNrm.xsd" xmlns:gn="geranNrm.xsd"
  xmlns:es="EricssonSpecificAttributes.4.7.xsd">
<fileHeader fileFormatVersion="32.615 V4.5" vendorName="Ericsson" />
<configData dnPrefix="">
  <xn:SubNetwork id="B1">
    <xn:SubNetwork id="RNC08">                    ← 610e
      <xn:MeContext id="RNC08">
      <xn:ManagedElement id="1">
      <un:RncFunction id="1">
      <un:UtranCell id="WTTL1G">
        <gn:GsmRelation id="WTTL1GAUB02D" modifier="create">
          <gn:attributes>
            <gn:adjacentCell>SubNetwork=B1 ,ExternalGsmCell=AUB02D</gn:adjacentCell>
          </gn:attributes>
          <xn:vsDataContainer id="WTTL1GAUB02D">
          <xn:attributes>
            <xn:vsDataType>vsDataGsmRelation</xn:vsDataType>
            <xn:vsDataFormatVersion>EricssonSpecificAttributes.4.7</xn:vsDataFormatVersion>
            <es:vsDataGsmRelation>
              <es:qOffsetIsn>15</es:qOffsetIsn>
            </es:vsDataGsmRelation>
          </xn:attributes>
          </xn:vsDataContainer>
        </gn:GsmRelation>
      </un:UtranCell>
      </un:RncFunction>
      </xn:ManagedElement>
      </xn:MeContext>
    </xn:SubNetwork>
  </xn:SubNetwork>
</configData>
<fileFooter dateTime="05:32:32">
</bulkCmConfigDataFile>
```

FIG. 6E

| Envelope Section | Structure |
|---|---|
| Header | ..cnai #Generated by NC on <current date and time> for CNAI R14G01 by user <user login in NC system><br>..capabilities BASIC<br>.utctime <current date and time> |
| Content for UTRAN_CELL Type | .subnetwork UNDEFINED<br>.domain UTRAN_CELL<br>.set <UTRAN cell id in Ericsson-OSS><br><parameter in Ericsson-OSS >=<value><br>...<br><parameter in Ericsson-OSS >=<value><br>.set <UTRAN cell id in Ericsson-OSS> PG |
| Content for UTRAN_NREL Type | .subnetwork B1<br>.domain UTRAN_NREL<br>.set <relation id in Ericsson-OSS><br><parameter in Ericsson-OSS >=<value><br>...<br><parameter in Ericsson-OSS >=<value><br>.set <relation id in Ericsson-OSS> PG |
| Footer | ..end |

..cnai #Generated by NC on 2009-01-20 12:09:00 for CNAI B1 by user Alpha
..capabilities BASIC
.utctime 2006-12-01 12:09:00
.subnetwork UNDEFINED
.domain UTRAN_CELL
.set 24:HOEF1G
RNCID="24"
CELL_NAME=" HOEF1G "
CI="29204"
DIVERSITY="NODIV"
FDDARFCN=10588
LAC="1"
MRSL=31
MCC="228"
MNC="001"
QQUALMIN=100
SCRCODE=16
SRATSEARCH=4
USERLABEL="UtranCell HOEF1G"
USEDFREQTHRESH2DECNO=-12
SOURCENAME=""
LATITUDE=?
LONGITUDE=?
ANTENNABEAMTYPE=0
BEAMDIRECTION="000"
PRIMARYCPICHPOWER=270
QRXLEVMIN=100
USEDFREQTHRESH2DRSCP=100
.set 24:HOEF1G PG
.subnetwork Delta
.domain UTRAN_NREL
.set THUOB:SPHS5D:24:HOEF1G
BSC_NAME="THUOB"
CELL_NAME="SPHS5D"
NREL_NAME="HOEF1G"
.set THUOB:SPHS5D:24:HOEF1G PG
..end

```xml
<apply-case-template casename="FAN Firmware Upgrade">
    <do rolename="Primary FAN" action="activate" template="Alcatel FAN Firmware Upgrade">
        <set-parameter name="FAN">
            <get-parameter name="object_id" />
        </set-parameter>
        <set-parameter name="IOS_image_filename">
            <get-parameter name="Firmware Image" />
        </set-parameter>
    </do>                                                                                          712c
    <do rolename="Primary FAN" action="activate" template="Alcatel FAN Full Config">
        <set-parameter name="FAN">
            <get-parameter name="object_id" />
        </set-parameter>
    </do>                                                                                          714c
    <do rolename="Secondary FAN" action="activate" template="Huawei FAN Firmware Upgrade">
        <after-list>
            <parameter name="Primary FAN" />
        </after-list>
        <set-parameter name="FAN">
            <get-parameter name="object_id" />
        </set-parameter>
        <set-parameter name="IOS_image_filename">
            <get-parameter name="Firmware Image" />
        </set-parameter>
    </do>                                                                                          716c
    <do rolename="Secondary FAN" action="activate" template="Huawei FAN Full Config">
        <set-parameter name="FAN">
            <get-parameter name="object_id" />
        </set-parameter>
    </do>                                                                                          718c
</apply-case-template>
```

FIG. 7C

Primary FAN
Configuration File Template
700d

```
configure system id ipd-<%=xxx><%=yyy>-s-fn-<%=mm%>
configure system mgnt-vlan-id 2
configure system management host-ip-address manual:<%=FAN_IP-addr%>/
    <%=netmask%>
configure system management default-route <%=gateway-IP-addr%>
configure system shub entry vlan ext-vlan-id 2
configure interface shub port 2 port-type network admin-status auto-up mc-flooding
    mode automatic
configure vlan shub id 2 name Management
egress-port network:2
  egress-port network:5
configure mstp general disable-stp
configure mstp port 2 disable-stp
configure mstp port 5 disable-stp
admin software-mngt shub database save
```

FIG. 7D

Secondary FAN
Configuration File Template
700e

```
frame 0 set desc ipd-<%=xxx%><%=yyy%>-s-fn-<%=mm%>
vlan 2 standard
port vlan 2 0/9 0
interface vlanif 2
ip address <%=FAN-IP-addr%> <%=netmask%> description Management
quit
ip route-static 0.0.0.0 0.0.0.0 <%=gateway_IP-addr%>
save
```

FIG. 7E

Primary FAN
Configuration File
700f

```
configure system id ipd-xxx000-s-fn-01
configure system mgnt-vlan-id 2
configure system management host-ip-address manual:1.1.1.1/32
configure system management default-route 2.2.2.2
configure system shub entry vlan ext-vlan-id 2
configure interface shub port 2 port-type network admin-status auto-up mc-flooding
    mode automatic
configure vlan shub id 2 name Management
egress-port network:2
  egress-port network:5
configure mstp general disable-stp
configure mstp port 2 disable-stp
configure mstp port 5 disable-stp
admin software-mngt shub database save
```

FIG. 7F

Secondary FAN
Configuration File
700g

```
frame 0 set desc ipd-xxx000-s-fn-01
vlan 2 standard
port vlan 2 0/9 0
interface vlanif 2
ip address 1.1.1.1 255.255.255.0 description Management
quit
ip route-static 0.0.0.0 0.0.0.0 2.2.2.2
save
```

FIG. 7G

NETWORK CONFIGURATION MANAGEMENT

FIELD OF THE INVENTION

The present invention relates generally to computer-based methods and apparatuses, including computer program products, for network configuration management.

BACKGROUND

Typical network planning and design changes, such as adding new network devices or changing parameters of existing network devices, are done tens or even hundreds of times a day in large networks. Network device changes are made in parallel by multiple engineers or locally at the network device by an engineer. These changes can cause related network devices to diverge from a centralized template and/or from each other. Due to this divergence, an engineer reviews any issues and changes the configuration for each network device individually. The engineer assesses the cross-dependencies and technical validity of the changes to the network device with other engineers, groups the changes, and plans the change execution in accordance with technical dependencies. When the engineer makes network device changes, the engineer manually analyzes the dependency between network devices and updates each network device accordingly. Thus, a need exists in the art for improved network configuration management.

SUMMARY

One approach to network configuration management is a method. The method includes generating a difference network configuration for a managed network based on a current network configuration and a proposed network configuration; identifying a network change case from the difference network configuration based on one or more network change case identification templates; selecting a network change case application template from one or more network change case application templates based on the identified network change case; selecting a first configuration file template based on the difference network configuration and the network change case application template; generating a first device configuration file for a first network device in the difference network configuration based on the difference network configuration, the network change case application template, and the first configuration file template; and storing the first device configuration file in a first storage device.

Another approach to network configuration management is a system. The system includes a configuration difference module configured to generate a difference network configuration for a managed network based on a current network configuration and a proposed network configuration; a case identification module configured to identify a network change case from the difference network configuration based on one or more network change case identification templates; a case application module configured to select a network change case application template from one or more network change case application templates based on the identified network change case; a configuration file module configured to select a first configuration file template based on the difference network configuration and the network change case application template; a configuration file generation module configured to generate a first device configuration file for a first network device in the difference network configuration based on the difference network configuration, the network change case application template, and the first configuration file template; and a first storage device configured to store the first device configuration file.

Another approach to network configuration management is a system. The system includes means for generating a difference network configuration for a managed network based on a current network configuration and a proposed network configuration; means for identifying a network change case from the difference network configuration based on one or more network change case identification templates; means for selecting a network change case application template from one or more network change case application templates based on the identified network change case; means for selecting a first configuration file template based on the difference network configuration and the network change case application template; means for generating a first device configuration file for a first network device in the difference network configuration based on the difference network configuration, the network change case application template, and the first configuration file template; and means for storing the first device configuration file.

In other examples, any of the approaches above can include one or more of the following features.

In some examples, the method further includes transmitting the first device configuration file to the first network device.

In other examples, the method further includes selecting a second configuration file template based on the difference network configuration and the network change case application template; generating a second device configuration file for a second network device in the difference network configuration based on the difference network configuration, the network change case application template, and the second configuration file template; and storing the second device configuration in a second storage device.

In some examples, the method further includes transmitting the second device configuration file to the second network device.

In other examples, the method further includes determining a transmission sequence for the first device configuration file and the second device configuration file based on the network change case application template; transmitting the first device configuration file to the first network device based on the transmission sequence; and transmitting the second configuration file to the second network device based on the transmission sequence.

In some examples, the network change case being indicative of an association between the first network device and a second network device in the managed network.

In other examples, the method further includes matching at least one role in the difference network configuration with one or more roles in each network change case identification template of the one or more network change case identification templates; and determining the network change case based on the role matches.

In some examples, each network change case identification template of the one or more network change case identification templates comprising a set of one or more interrelated roles for one or more sub-networks, one or more network devices, one or more network components, or any combination thereof.

In other examples, the method further includes selecting the first configuration file template based on the difference network configuration, the network change case application template, and the first network device in the difference network configuration.

In some examples, the method further includes identifying one or more sets of one or more network devices in the difference network configuration; and determining a type from a set of types for each of the sets of one or more network devices identified in the difference network configuration.

In other examples, the method further includes determining if each of the sets of one or more network devices is complete based on the type; and modifying the proposed network configuration based on the determination if each of the sets of one or more network elements is complete and one or more network configuration rules.

In some examples, the method further includes determining the current network configuration from a current configuration storage device; and determining the proposed network configuration from a proposed configuration storage device.

In other examples, the first configuration file template includes a header, one or more content parts, and/or a footer.

In some examples, the first configuration file template includes at least one reference to another configuration file template.

In other examples, the first configuration file template includes one or more optional sections, the one or more optional sections comprising information indicative of an optional status.

In some examples, the first device configuration file includes a partial configuration file for the first network device.

In other examples, the method further includes generating the first device configuration file for the first network device in the difference network configuration based on the difference network configuration, the network change case application template, the first configuration file template, and the current network configuration.

In some examples, the method further includes determining one or more attributes for the first device configuration file based on the first configuration file template; determining one or more values for each of the one or more attributes based on the difference network configuration; and modifying the first configuration file template with the values of the one or more attributes.

In other examples, the method further includes normalizing the difference network configuration based on the one or more network change case identification templates.

In some examples, the method further includes modifying the difference network configuration based on one or more network configuration rules.

In other examples, the method further includes storing the one or more network configuration rules in a network configuration management system.

In some examples, the method further includes determining if the network change case is identified from the difference network configuration; and modifying the proposed network configuration based on the determination if the network change case is identified and one or more network configuration rules.

In other examples, the method further includes determining if one or more network change cases are identified from the difference network configuration; and transmitting a configuration error notification based on the determination if the network change case is identified.

In some examples, the method further includes generating the proposed network configuration based on a plurality of configuration change requests.

In other examples, a computer program product is tangibly embodied in an information carrier and the computer program product includes instructions being operable to cause a data processing apparatus to perform any of the approaches and/or examples described herein.

In some examples, the system further includes a communication module configured to transmit the first device configuration file to the first network device.

In other examples, the system further includes the configuration file module further configured to select a second configuration file template based on the difference network configuration and the network change case application template; the configuration file generation module further configured to generate a second device configuration file for a second network device in the difference network configuration based on the difference network configuration, the network change case application template, and the second configuration file template; and a second storage device configured to store the second device configuration.

In some examples, the system further includes the communication module further configured to transmit the second device configuration file to the second network device.

In other examples, the system further includes the case application module further configured to determine a transmission sequence for the first device configuration file and the second device configuration file based on the network change case application template; and a communication module configured to: transmit the first device configuration file to the first network device based on the transmission sequence, and transmit the second configuration file to the second network device based on the transmission sequence.

In some examples, the system further includes match at least one role in the difference network configuration with one or more roles in each network change case identification template of the one or more network change case identification templates; and determine the network change case based on the role matches.

In other examples, the system further includes the configuration file module further configured to select the first configuration file template based on the difference network configuration, the network change case application template, and the first network device in the difference network configuration.

In some examples, the system further includes the case application module further configured to identify one or more sets of one or more network devices in the difference network configuration; and determine a type from a set of types for each of the sets of one or more network devices identified in the difference network configuration.

In some examples, the system further includes the case application module further configured to determine if each of the sets of one or more network devices is complete based on the type; and modify the proposed network configuration based on the determination if each of the sets of one or more network elements is complete and one or more network configuration rules.

In other examples, the system further includes a current configuration module configured to determine the current network configuration from a current configuration storage device; and a proposed configuration module configured to determine the proposed network configuration from a proposed configuration storage device.

In some examples, the system further includes the configuration file generation module further configured to generate the first device configuration file for the first network device in the difference network configuration based on the difference network configuration, the network change case application template, the first configuration file template, and the current network configuration.

In other examples, the system further includes the configuration file generation module further configured to determine one or more attributes for the first device configuration file based on the first configuration file template; determine one or more values for each of the one or more attributes based on the difference network configuration; and modify the first configuration file template with the values of the one or more attributes.

In some examples, the system further includes the difference configuration module further configured to normalize the difference network configuration based on the one or more network change case identification templates.

In other examples, the system further includes the difference configuration module further configured to modify the difference network configuration based on one or more network configuration rules.

In some examples, the system further includes a network configuration management system configured to store the one or more network configuration rules.

In other examples, the system further includes the case identification module further configured to determine if the network change case is identified from the difference network configuration; and modify the proposed network configuration based on the determination if the network change case is identified and one or more network configuration rules.

In some examples, the system further includes the case identification module further configured to determine if one or more network change cases are identified from the difference network configuration; and a communication module configured to transmit a configuration error notification based on the determination if the network change case is identified.

In other examples, the system further includes a proposed configuration module configured to generate the proposed network configuration based on a plurality of configuration change requests.

The network configuration management techniques described herein can provide one or more of the following advantages. An advantage to the network configuration management is that inventory changes can be separate from the configuration file changes which increases the consistency by requiring any configuration changes to be made based on configuration templates that include the semantic relationships between network devices. Another advantage to the network configuration management is that the automatic update of the configuration of network devices by generating configuration files based on semantic network design rules while considering parallel changes increases the efficiency of the network configuration management by decreasing the time required to perform the updates to the network devices. Another advantage to the network configuration management is that the automatic update of the configuration of network devices eliminates the manual analysis of changes and makes the changes automatically based on semantic relationships between the network devices, thereby decreasing the time required to make changes to the managed network.

An additional advantage to the network configuration management is that the configuration of thousands of network devices (e.g., via an firmware upgrade, via a network merger, etc.) can be done concurrently based on the semantic relationship between the network devices while still maintaining the integrity and consistency of the network design policies. Another advantage to the network configuration management is that the configuration of network devices can be automatically managed via the semantic rules thereby optimizing the replication processes for network management and/or enterprise management.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings.

FIG. 1 is a diagram of an exemplary network;

FIG. 3A is a diagram of an exemplary network configuration management system;

FIG. 5E is an exemplary network change case identification template;

FIG. 5F is an exemplary network change case application template;

FIG. 5G is an exemplary configuration file template;

FIG. 5H is an exemplary device configuration file for a remote router;

FIG. 5I is an exemplary device configuration file for a main router;

FIG. 6B is another exemplary network change case identification template;

FIG. 6C is another exemplary network change case application template;

FIG. 6D is an exemplary configuration file template for a GSM network device;

FIG. 6E is another exemplary device configuration file for the GSM network device;

FIG. 6F is an exemplary configuration file template for an UMTS network device;

FIG. 6G is an exemplary device configuration file for the UMTS network device;

FIG. 7C is of an exemplary network change case application template;

FIG. 7D is of an exemplary configuration file template for a primary fiber access node (FAN);

FIG. 7E is an exemplary configuration file template for a secondary FAN;

FIG. 7F is an exemplary device configuration file for the primary FAN;

FIG. 7G is an exemplary device configuration file for the secondary FAN;

DETAILED DESCRIPTION

Figure 2A:
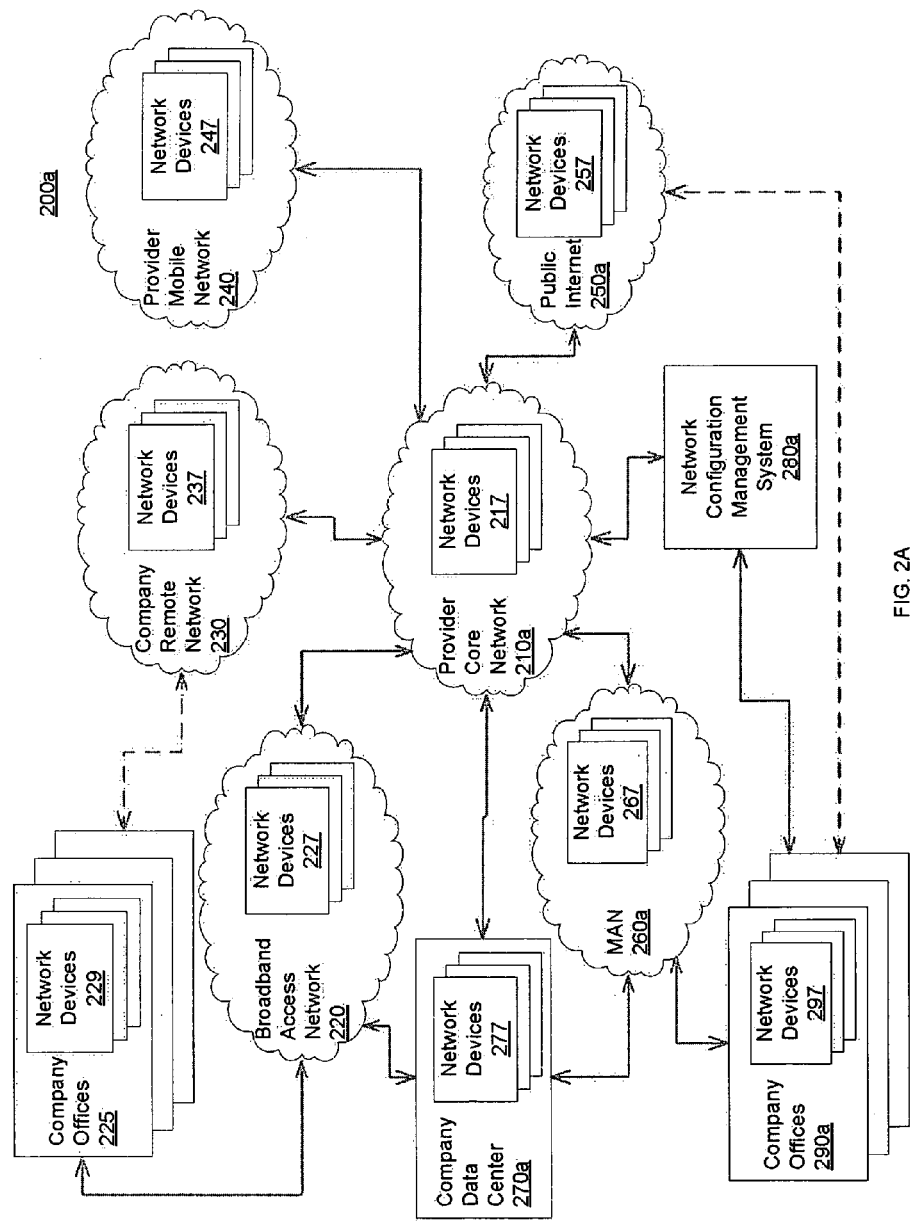
FIG. 2A is a diagram of another exemplary network.

Network configuration management technology enables the configuration management of a large number of network devices in a managed network. The technology can provide a solution for semantic, optimistic replication-based network configuration management. The technology can utilize the semantic relationship between network devices and/or the components of the network devices to ensure that any automatic changes are properly made with respect to the managed network design rules, i.e., the technology can take a holistic approach to network configuration management by ensuring that all or substantially all changes to the managed network abide by the managed network design rules. The technology can further utilize the semantic relationship between the network devices and/or the components of the network devices to enable multiple changes by multiple parties (e.g., network planners, network administrators, customer service administrators, etc.) and ensure that the multiple changes when made to the managed network are made with respect to the managed network design rules. In other words, the technology can significantly reduce the complex, detailed analysis for every change in the managed network by tying changes to the semantic relationship between the network devices and/or the components of the network devices.

The technology can track a current configuration of the managed network and track proposed changes to the configuration of the managed network. The technology can analyze the current configuration and the proposed configuration to generated a delta between the configurations. The technology can utilize the delta to identify a network change case. The network change case can provide a standardized description of any changes that can occur on the managed network (e.g., add a network device, add a network connection, activate a network connection, etc.). The technology can utilize the identified network change case to select a network change case application template. The network change case application template can provide a standardized set of for the application of changes for the identified network change case (e.g., activate a first network device before a second network device, activation of a network device requires certain attributes, etc.). The technology can utilize the network change case application template and the delta to select a configuration file template for the network device. The configuration file template for the network device can provide a standardized set of instructions for the configuration of the network device (e.g., retry attempts, domain name server ip address, packet size, etc.). The technology can generate a configuration file for the network device based on the templates and configuration information. The technology can generate any number of configuration files based on the templates, any sub-set of the templates with other templates, and/or any of the configuration information.

FIG. 1 is a diagram of an exemplary network 100. The network 100 includes a provider core network 110, a broadband access network 120, one or more company office 125, a company remote network 130, one or more company office 135, a provider mobile network 140, one or more mobile device 145, a public internet 150, one or more company offices 155, a metropolitan area network (MAN) 160, a company data center 170, a network configuration management system 180, and one or more company offices 190. The networks 110, 120, 130, 140, 150, and 160 are interconnected via one or more network connections (e.g., direct wired connection, indirect wired connection, wireless connection, telephony connection, frame relay connection, fiber optic connection, digital signal 1 (T-1) connection, optical carrier 3 (OC-3) connection, a digital subscriber line (DSL) connection, an integrated service digital network (ISDN) connection, etc.) utilizing any type of network communication techniques (e.g., transmission control protocol/internet protocol (TCP/IP), asynchronous transfer mode (ATM), packet-based communication technique, circuit-based communication technique, etc.).

The one or more company offices 125 are connected to the broadband access network 120 (e.g., via DSL connection, via a cable connection, etc.). The one or more company offices 125 can be connected to the company remote network 130 via a backup connection (e.g., via dial-up connection over a telephone network, via an ISDN connection, via a frame relay connection, etc.). The one or more company offices 135 are connected to the company remote network 130. The one or more mobile devices 145 are connected to the provider mobile network 140. The one or more company offices 155 are connected to the public internet 150. The one or more company offices 190 are connected to the MAN 160. The one or more company offices 190 can be connected to the public internet 150 via a backup connection.

The company data center 170 is connected to the broadband access network 120, the provider core network 110, and the MAN 160. The company data center 170 provides data center services (e.g., market and sales management service, product management service, customer management service, service management service, supplier and partner management service, enterprise management service, internet service, intranet service, world wide web (WWW) service, e-mail service, domain name system (DNS) service, etc.) to the one or more company offices 125, 135, 155, and 190 and/or the mobile device 145. Although FIG. 1 only illustrates the company data center 170 connected to the broadband access network 120, the provider core network 110, and the MAN 160, the company data center 170 can be connected to any of the networks, offices, systems, devices, and/or centers in the network 100.

The network configuration management system 180 manages the network configuration for the network 100. The network configuration management system 180 can, for example, generate device configuration files (e.g., a plain text file, extensible markup language (XML) file, a binary file, etc.) for network devices in the network 100. For example, the network configuration management system 180 can generate new device configuration files for all of the routers in the network 100 based on a firmware upgrade for the routers (in other words, a completely new configuration file can be generated for each network device). As another example, the network configuration management system 180 can generate supplemental device configuration files for two of the routers in the network 100 based on a new backup connection between the routers. As a further example, the network configuration management system 180 can generate supplemental device configuration files for every network device in the network 100 to update the IP addresses for all network devices (in this example, the company's IP address is switched from a class C subnet to a class B subnet). The network configuration management system 180 can be, for example, included in the company data center 170 and/or components of the network configuration management system 180 can be, for example, included in the company data center 170.

It should be understood that FIG. 1 illustrates an exemplary network 100 that includes the network configuration management system 180 and that the network configuration management system 180 can be utilized in any type of network (e.g., local area network (LAN), wide area network (WAN), heterogonous network, provider network, campus area network (CAN), world-wide network, etc.) and/or can utilize any type (e.g., a fiber optic connection, a plain old telephone service (POTS) connection, etc.) and/or number of connections (e.g., five inter-connections, one hundred inter-connections, etc.).

Although FIG. 1 illustrates the backup connections between the one or more company offices 190 and the public internet 150 and between the one or more company office 125 and the company remote network 130, any of the networks, offices, systems, devices, and/or centers (also referred to as the components of the network 100) can include backup connections to any of the other components of the network 100. For example, the company data center 170 includes a backup connection to the company remote network 130 (via a T-1 connection).

FIG. 2A is a diagram of another exemplary network 200a. The network 200a includes a provider core network 210a, a broadband access network 220, one or more company offices 225, a remote company network 230, a provider mobile network 240, a public interne 250a, a MAN 260a, a company data center 270a, a network configuration management system 280a, and one or more company offices 290a. Each of the networks 210a, 220, 230, 240, 250a, and 260a, the company data center 270a, and each of the one or more company offices 225 and 290a include one or more network devices 217, 227, 237, 247, 257, 267, 277, 229, and 297, respectively.

The network configuration management system 280a manages the configuration for each of the one or more network devices 217, 227, 237, 247, 267, 277, 229, and 297. The network configuration management system 280a can, for example, generate a device configuration file for each of the one or more network devices 217, 227, 237, 247, 267, 277, 229, and 297. An advantage to the network configuration management is that the network configuration management system 280a generates individualized device configuration files for each of the network devices based on centralized templates uniformly and automatically, thereby increasing the management efficiency of the network 200a by decreasing the time required to make changes to the configuration of the network 200a.

Figure 2B:
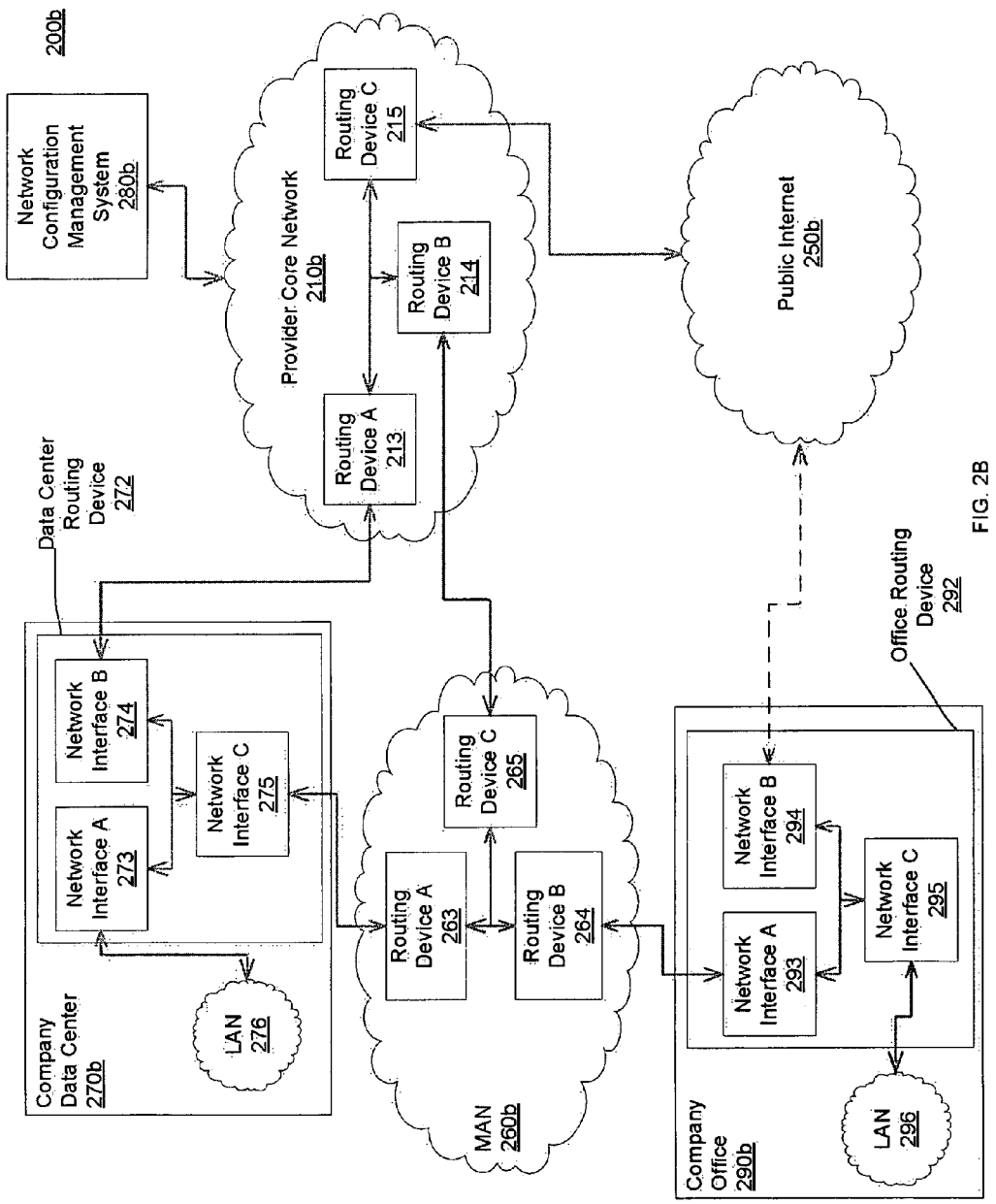
FIG. 2B is a diagram of another exemplary network.

FIG. 2B is a diagram of another exemplary network 200b. The network 200b includes a provider core network 210b, a public interne 250b, a MAN 260b, a company data center 270b, a network configuration management system 280b, and a company office 290b. The provider core network 210b includes routing devices A 213, B 214, and C 215. The MAN 260b includes routing devices A 263, B 264, and C 265. The company data center 270b includes a data center routing device 272 and a local area network (LAN) 276. The data center routing device 272 includes network interfaces A 273, B 274, and C 275. The company office 290b includes an office routing device 292 and a LAN 296. The office routing device 292 includes network interfaces A 293, B 294, and C 295.

The provider core network 210b is connected to the public internet 250b via the routing device C 215. The public internet 250b and the company office 290b are interconnected via a backup connection that is connected to the network interface B 294. The MAN 260b is connected to the company office 290b via the routing device B 264 and the network interface A 293. The MAN 260b is connected to the provider core network 210b via the routing device C 265 and the routing device B 214. The MAN 260b is connected to the company data center 270b via the routing device A 263 and the network interface C 275. The LAN 296 of the company office 290b is connected to other networks via the network interface C 295. The LAN 276 of the company data center 270b is connected to other networks via the network interface A 273.

The network configuration management system 280b manages the configuration for each of the one or more network devices 213, 214, 215, 263, 264, 265, 273, 274, 275, 293, 294, and 295. The network configuration management system 280a can, for example, generate a device configuration file for each of the one or more network devices 213, 214, 215, 263, 264, 265, 273, 274, 275, 293, 294, and 295.

FIG. 3A is a diagram of an exemplary network configuration management system 380 in another exemplary network 300a. The network configuration management system 380 includes a communication module 381, a current configuration module 382, a proposed configuration module 383, a difference configuration module 384, a case identification module 385, a case application module 386, a configuration file module 387, a configuration file generation module 388, an input device 391, an output device 392, a display device 393, a processor 394, and a storage device 395. The modules and devices described herein can, for example, utilize the processor 394 to execute computer executable instructions and/or include a processor to execute computer executable instructions (e.g., an encryption processing unit, a field programmable gate array processing unit, etc.). It should be understood that the network configuration management system 380 can include, for example, other modules, devices, and/or processors known in the art and/or varieties of the illustrated modules, devices, and/or processors.

The communication module 381 transmits the device configuration file to the respective network device. The current configuration module 382 determines the current network configuration. The proposed configuration module 383 determines the proposed network configuration.

The difference configuration module 384 generates a difference network configuration (also referred to as a delta) for the network 300a based on a current network configuration and a proposed network configuration. The case identification module 385 identifies a network change case from the difference network configuration based on one or more network change case identification templates.

The case application module 386 selects a network change case application template from one or more network change case application templates based on the identified network change case. The configuration file module 387 selects a configuration file template based on the difference network configuration and a network change case application template. The configuration file generation module 388 generates a device configuration file for a network device in the difference network configuration based on the difference network configuration, the network change case application template, the configuration file template and/or the current network configuration.

The input device 391 receives information associated with the network configuration management system 380 (e.g., instructions from a user, instructions from another computing device, etc.) from a user (not shown) and/or another computing system (not shown). The input device 391 can include, for example, a keyboard, a scanner, etc. The output device 392 outputs information associated with the network configuration management system 380 (e.g., information to a printer (not shown), information to a speaker, etc.).

The display device 393 displays information associated with the network configuration management system 380 (e.g., status information, configuration information, etc.). The processor 394 executes the operating system and/or any other computer executable instructions for the network configuration management system 380 (e.g., executes applications, etc.).

The storage device 395 stores configuration information, status information, one or more network change case identification templates, one or more network change case application templates, one or more configuration file templates, and/or any other data associated with the network configuration management system 380. The storage device 395 can include a plurality of storage devices and/or the network configuration management system 380 can include a plurality of storage devices (e.g., a proposed configuration storage device, a current configuration storage device, etc.). The storage device 395 can include, for example, long-term storage (e.g., a hard drive, a tape storage device, flash memory, etc.), short-term storage (e.g., a random access memory, a graphics memory, etc.), and/or any other type of computer readable storage.

Figure 3B:
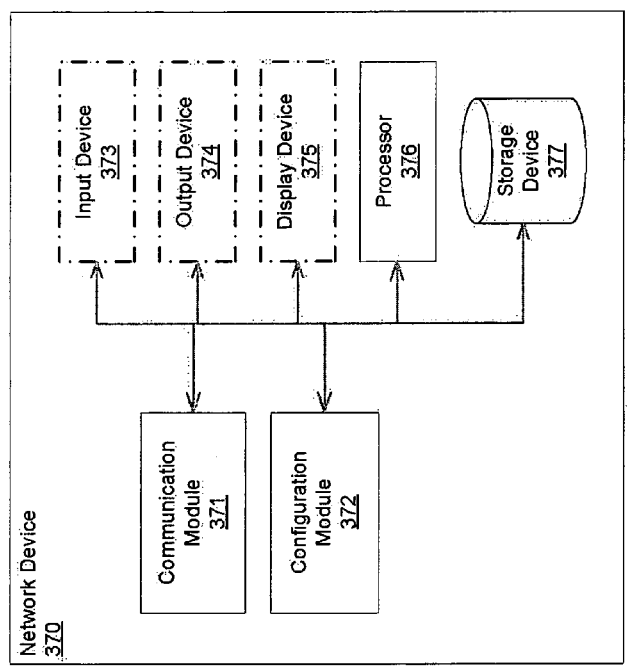
FIG. 3B is a diagram of exemplary components of a network device.

FIG. 3B is a diagram of exemplary components of a network device 370 in another exemplary network 300b. The network device 370 includes a communication module 371, a configuration module 372, an input device 373, an output device 374, a display device 375, a processor 376, and a storage device 377. The modules and devices described herein can, for example, utilize the processor 376 to execute computer executable instructions and/or include a processor to execute computer executable instructions (e.g., a network processing unit, a field programmable gate array processing unit, etc.). It should be understood that the network device 370 can include, for example, other modules, devices, and/or processors known in the art.

The communication module 371 communicates information and/or data to/from the network device 370. The configuration module 272 stores and/or updates the configuration file for the network device 370.

The input device 373 receives information associated with the network device 370 (e.g., instructions from a user, instructions from another computing device, etc.) from a user (not shown) and/or another computing system (not shown). The input device 373 can include, for example, a keyboard, a scanner, etc. The output device 374 outputs information associated with the network device 370 (e.g., information to a printer (not shown), information to a speaker, etc.).

The display device 375 displays information associated with the network device 370 (e.g., status information, configuration information, etc.). The processor 376 executes the operating system and/or any other computer executable instructions for the network device 370 (e.g., executes applications, etc.).

The storage device 377 stores configuration information, status information, and/or any other data associated with the network device 370. The storage device 377 can include, for example, long-term storage (e.g., a hard drive, a tape storage device, flash memory, etc.), short-term storage (e.g., a random access memory, a graphics memory, etc.), and/or any other type of computer readable storage.

Figure 4A:
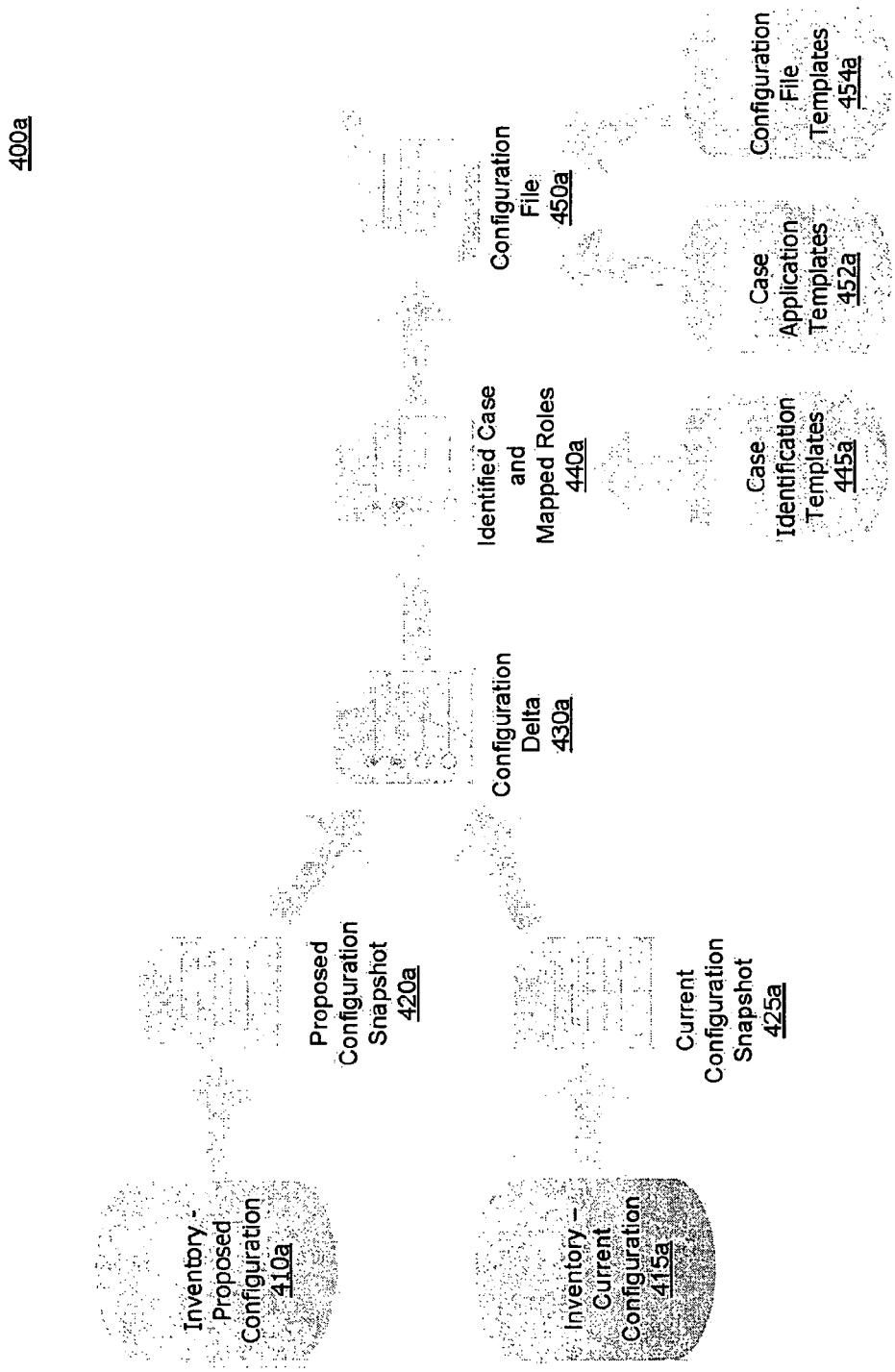
FIG. 4A is a flow diagram of an exemplary process for configuration file generation.

FIG. 4A is a flow diagram 400a of an exemplary process for configuration file generation utilizing, for example, the network configuration management system 380 of FIG. 3A. The proposed configuration module 383 maintains the inventory of the proposed configuration 410a (e.g., stores, updates, corrects inconsistencies, etc.). The proposed configuration module 383 generates a proposed configuration snapshot 420a. The current configuration module 382 maintains the inventory of the current configuration 415a (e.g., stores, updates, corrects inconsistencies, etc.). The current configuration module 382 generates a current configuration snapshot 425a. The difference configuration module 384 generates a configuration delta for 430a (also referred to as a difference network configuration). The case identification module 385 identifies one or more network change cases and/or mapped roles 440a based on one or more case identification templates 445a. The case application module 386 selects a network change case application template 452a. The configuration file generation module 388 generates a configuration file 450a based on the configuration file templates 454a and the case application template 452a. The network configuration management technology described herein can advantageously impose network configuration rules (e.g., via the network change case application template, via the device configuration template, etc.) on any inventory planning changes to ensure network integrity and thus eliminate the manual work of resolving configuration conflicts, thereby increasing the overall efficiency of the network configuration management process.

Figure 4B:
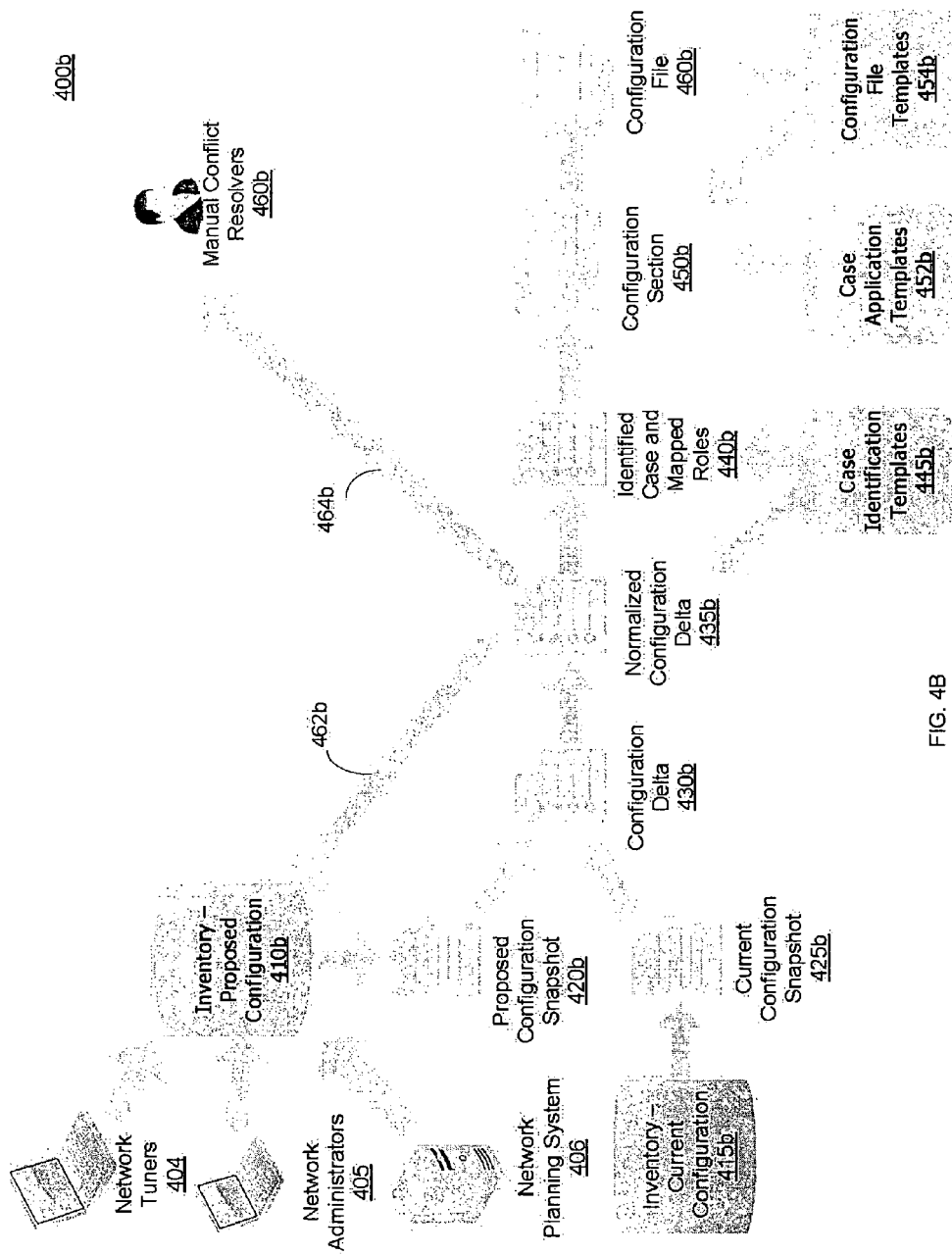
FIG. 4B is a flow diagram of another exemplary process for configuration file generation.

FIG. 4B is a flow diagram 400b of another exemplary process for configuration file generation utilizing, for example, the network configuration management system 380 of FIG. 3A. The proposed configuration module 383 maintains the inventory of the proposed configuration 410b. The proposed configuration module 383 receives a plurality of configuration change requests from network tuners 404, network administrators 405, and/or a network planning system 406. The plurality of configuration change requests can be for different network devices and/or the same network device. In other words, the plurality of configuration change requests can conflict with each other. The proposed configuration module 383 can optimistically accept all configuration change requests and/or resolve any conflicts during the network configuration management process as described herein.

The proposed configuration module 383 generates a proposed configuration snapshot 420b. In some examples, the proposed configuration module 383 can generate the proposed configuration snapshot 420b based on any state of the inventory of the proposed configuration 410b (e.g., state from one hour ahead, state from two weeks ahead etc.).

The current configuration module 382 maintains the inventory of the current configuration 415b. The current configuration module 382 generates a current configuration snapshot 425b. In some examples, the current configuration module 382 can generate the current configuration snapshot 425b based on any state of the inventory of the current configuration 415b (e.g., state from one hour before, state from one week ago, state two changes ago, etc.).

The difference configuration module 384 generates a configuration delta 430b (also referred to as a difference configuration). The difference configuration module 384 normalizes the configuration delta to form a normalized configuration delta 435b. The normalization of the configuration delta to form the normalized configuration delta 435b can include modifying the configuration delta 430b and/or the inventory of the proposed configuration 410b based on one or more network change case identification templates and/or one or more network configuration rules (e.g., add a back relationship based on a forward relationship between two network devices, subnet address determined based on IP address class, etc.).

If the inventory of the proposed configuration 410*b* is modified, the processing returns to the generation of the proposed configuration snapshot 420*b* by the proposed configuration module 383. If a conflict in the configuration delta 430*b* is not resolved (e.g., missing required information, etc.), the conflict is transmitted to manual conflict resolvers 460*b* and processing terminates until the conflict is resolved.

The case identification module 385 identifies one or more network change cases and/or mapped roles 440*b* based on one or more case identification templates 445*a*. The case application module 386 selects a network change case application template 452*b* and/or generates a configuration section 450*b* (e.g., lists the required and/or optional configuration for the network change case) based on the case application template 452*b*. The configuration file generation module 388 generates a configuration file 460*b* based on the configuration section 450*b*, the configuration file templates 454*b*, and/or the case application template 452*b*.

After the configuration file 460*b* is transmitted to the network device, the current configuration module 383 can update the inventory of the current configuration 415*b* based on the configuration file 460*b*. For example, the Bri0 network interface is added to the network device in the configuration file 460*b* and this network interface information is added to the inventory of the current configuration 415*b*.

The network configuration management technology described herein can advantageously leverage the semantic relationship between network devices using the network change case application templates to efficiency manage a plurality of network devices while allowing a plurality of configuration change requests. In other words, the network configuration management technology described herein can allow optimistic configuration change requests and can enforce the semantic relationships between network devices, thereby increasing the efficiency of the network planners by allowing them to make systematic changes to the network that are correctly defined based on the semantic relationships between the network devices. Another advantage of the network configuration management described herein is that the conflict resolution for network changes is based in the configuration file generation which enables the conflict resolution to be generic across a managed network, thereby making conflict resolution and network manage understandable by network engineers throughout a managed network.

Figure 5A:
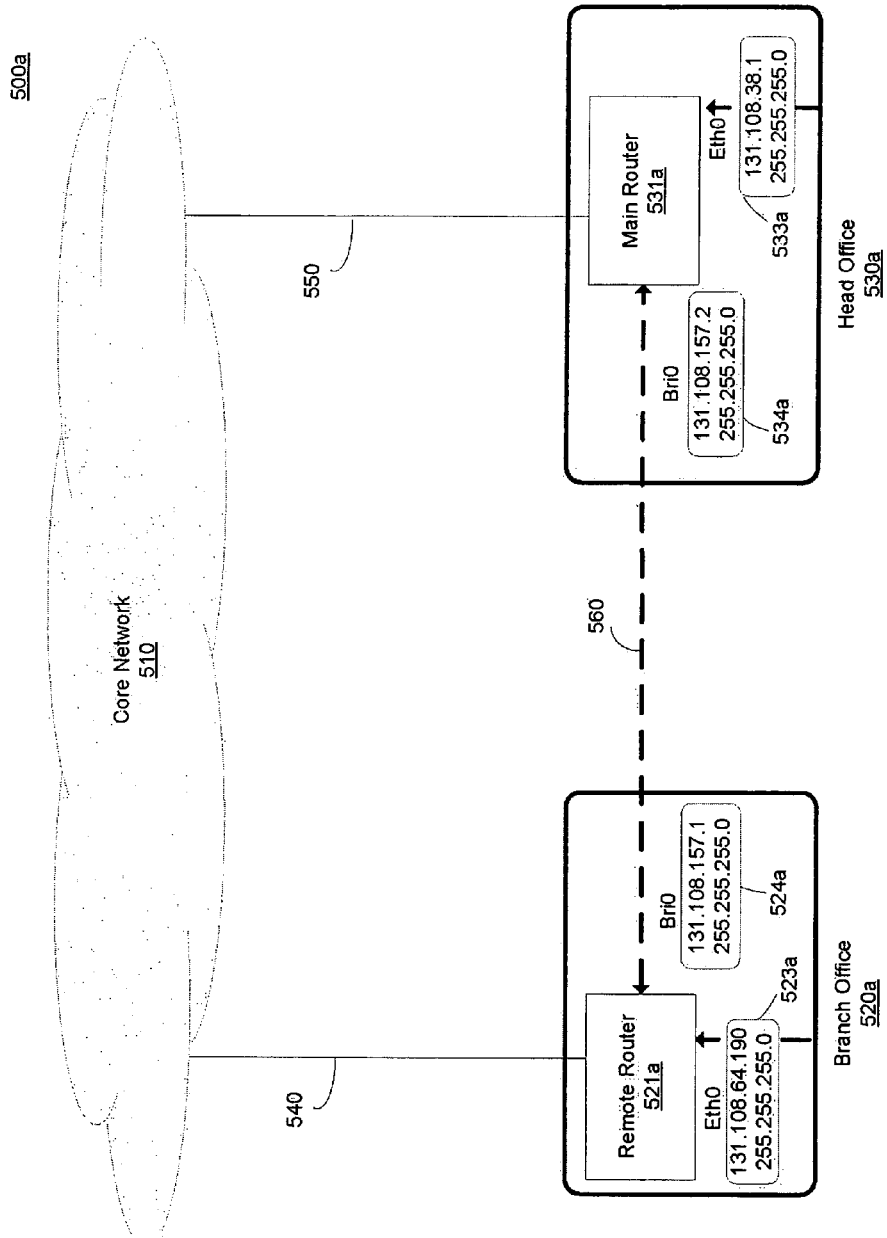
FIG. 5A is a diagram of another exemplary network.

FIG. 5A is a diagram of another exemplary network 500*a*. The network 500*a* includes a core network 510, a branch office 520*a*, and a head office 530*a*. The branch office 520*a* includes a remote router 521*a*. The remote router 521*a* includes an Eth0 network interface 523*a* and a Bri0 network interface 524*a*. The head office 530*a* includes a main router 531*a*. The main router 531*a* includes an Eth0 network interface 533*a* and a Bri0 network interface 534*a*.

The branch office 520*a* is connected to the core network 510 via a network connection 540 (e.g., a T-1 connection, an OC-3 connection, a DSL connection, etc.). The branch office 520*a* is connected to the branch office LAN via the Eth0 network interface 523*a*. The head office 530*a* is connected to the core network 510 via a network connection 550 (e.g., a T-3 connection, a cable connection, etc.). The head office 530*a* is connected to the branch office LAN via the Eth0 network interface 533*a*.

The branch office 520*a* is connected to the head office 530*a* via a backup network connection 560 (in this example, an ISDN connection) via the Bri0 network interface 524*a* and the Bri0 network interface 534*a*, respectively. In some examples, the backup network connection 560 is a proposed change to the network 500*a*. In other words, the current network configuration includes the network connections 540 and 550, and the proposed network configuration includes the network connections 540, 550, and 560. In this example, the difference network configuration includes the network connection 560 and the respective network interface 524*a* and 534*a*.

Figure 5B:
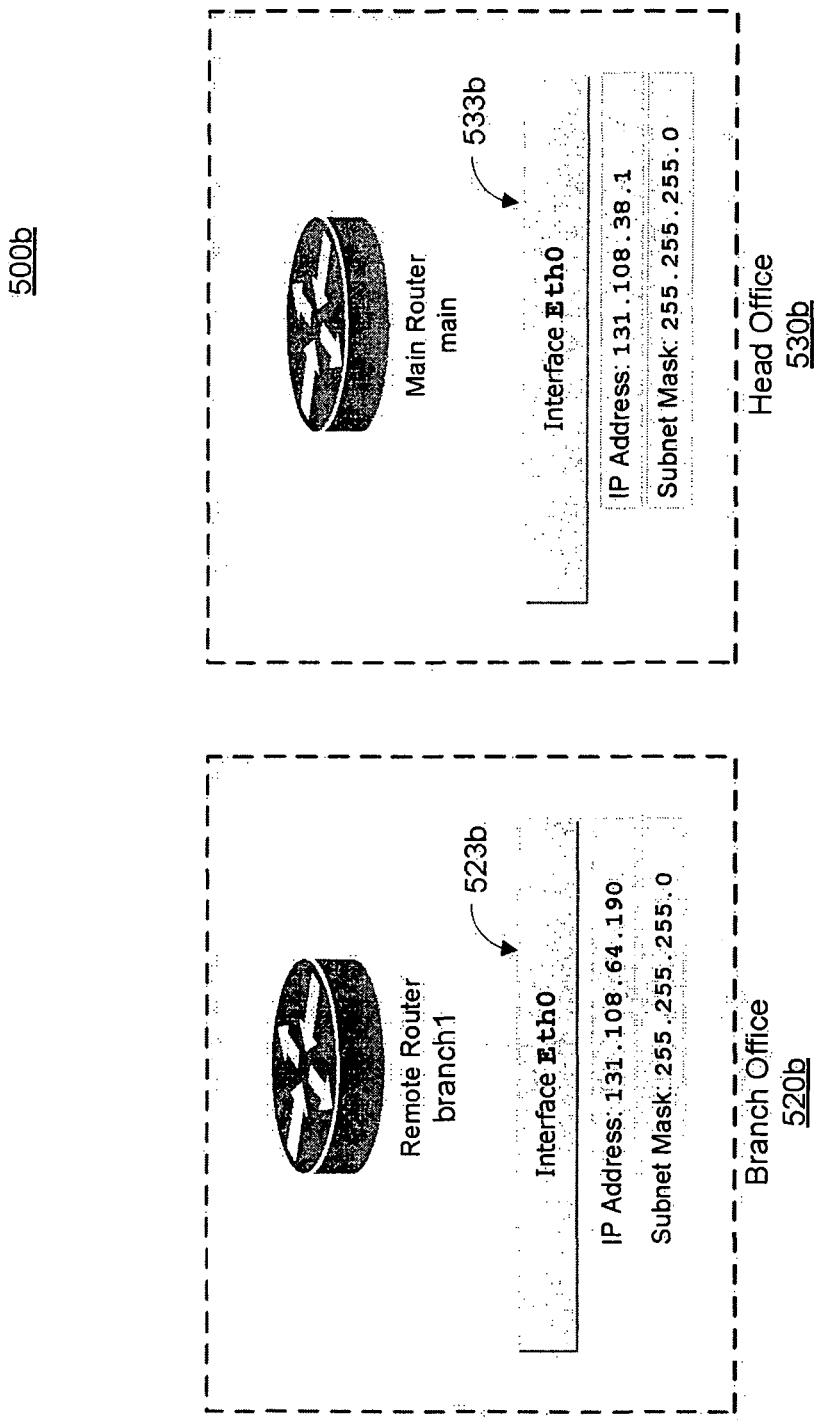
FIG. 5B is a block diagram of exemplary current configuration of network devices.

FIG. 5B is a block diagram of exemplary current configuration of network devices 520*b* and 530*b* in a current network configuration 500*b*. The current network configuration 500*b* includes the current branch office network device 520*b* and the current home office network device 530*b*. The current branch office network device 520*b* includes an Eth0 network interface 523*b*. The current home office network device 530*b* includes an Eth0 network interface 533*b*. In this example, the current network configuration 500*b* includes the network interfaces 523*b* and 533*b*.

Figure 5C:
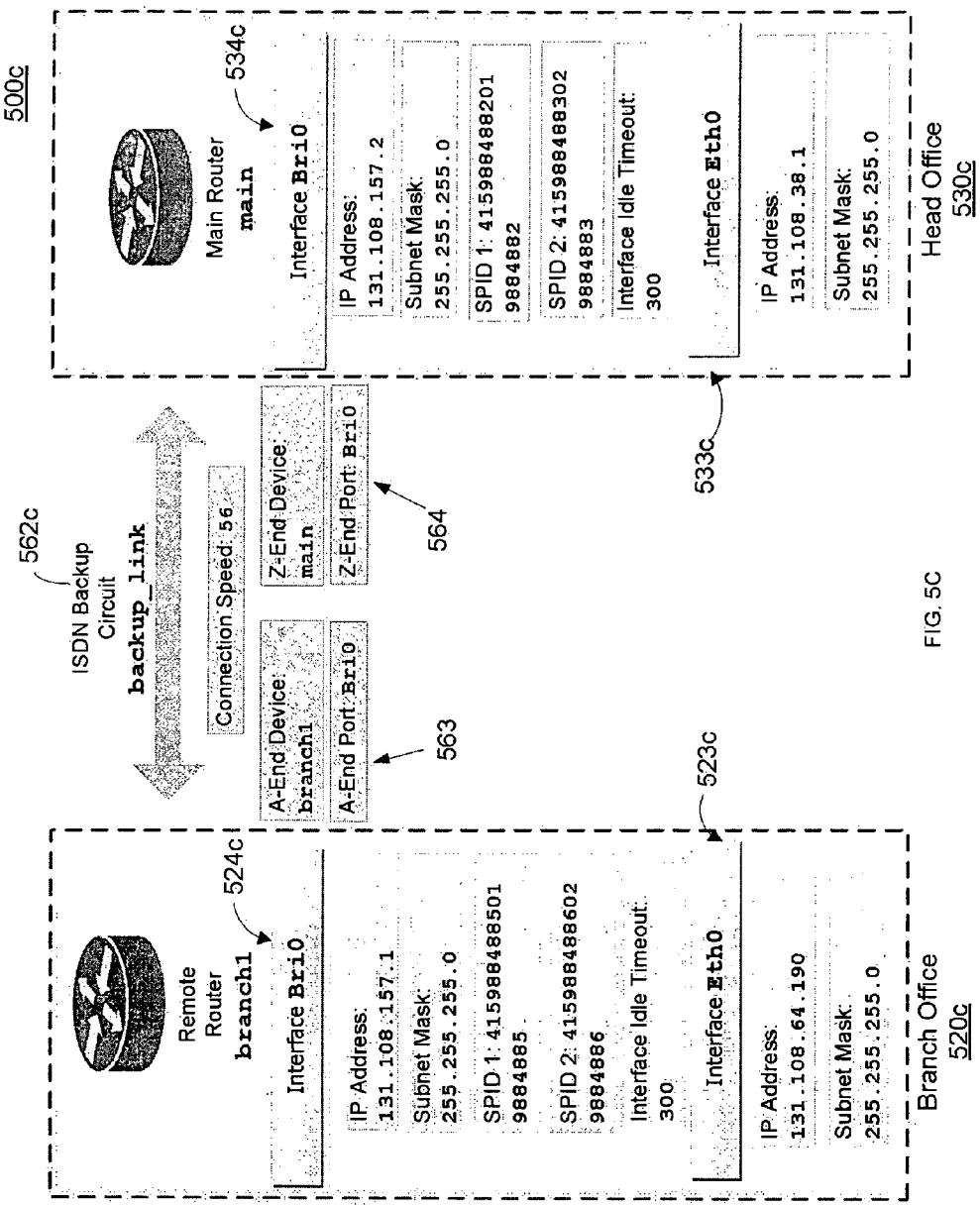
FIG. 5C is a block diagram of exemplary proposed configuration of network devices.

FIG. 5C is a block diagram of exemplary proposed configuration of network devices 520*c* and 530*c* in a proposed network configuration 500*c*. The proposed network configuration 500*c* includes the proposed branch office network device 520*c*, the proposed home office network device 530*c*, and an ISDN backup circuit 562*c*. The proposed branch office network device 520*c* includes an Eth0 network interface 523*c* and a Bri0 network interface 524*c*. The proposed home office network device 530*c* includes an Eth0 network interface 533*c* and a Bri0 network interface 534*c*. The ISDN backup circuit 562*c* includes information for each device 563 and 564 that enable the establishment of the network connection. In this example, the proposed network configuration 500*c* includes the network interfaces 523*c*, 524*c*, 533*c*, and 534*c* and the ISDN backup circuit 562*c*.

Figure 5D:
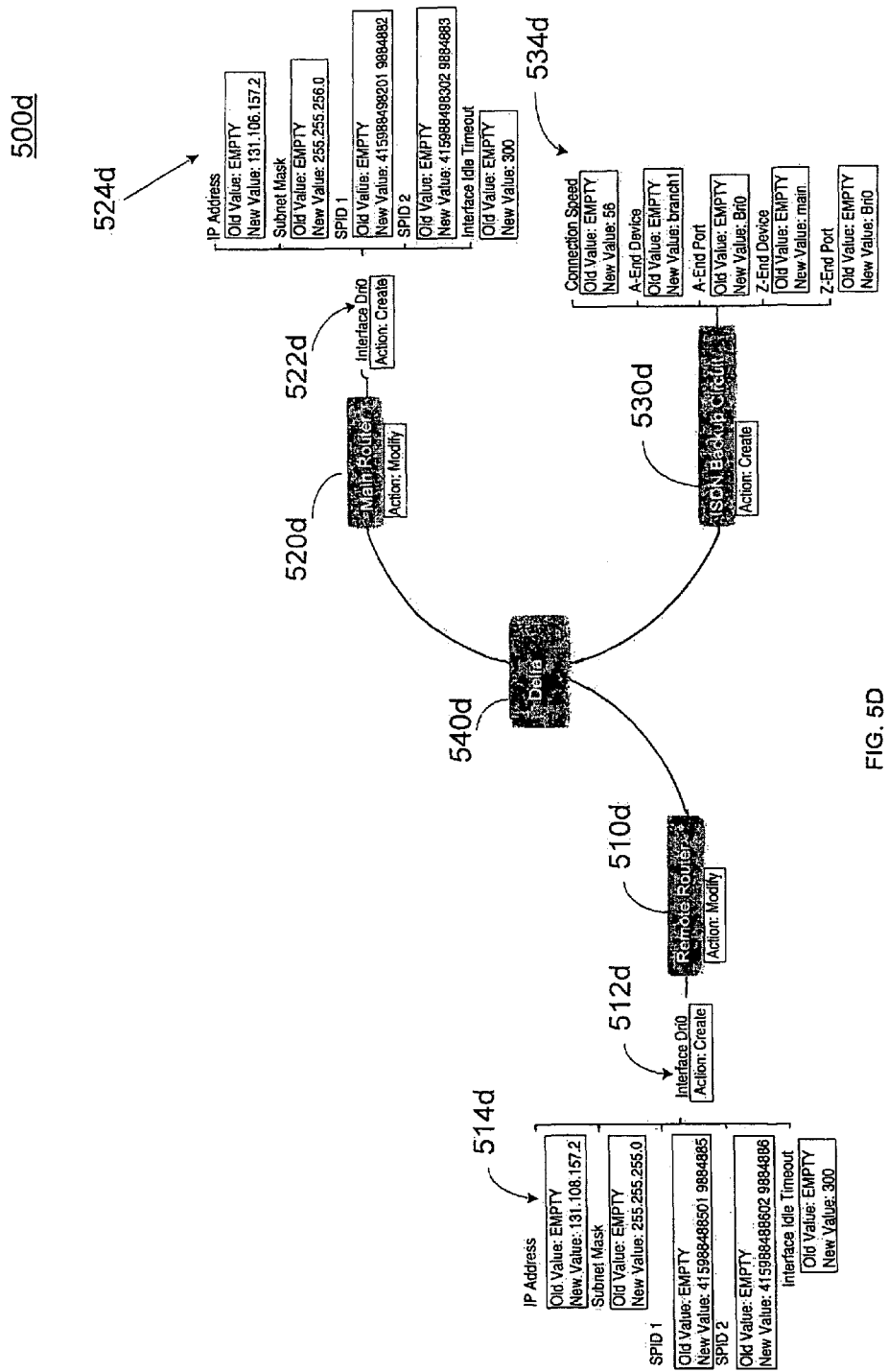
FIG. 5D is a diagram of an exemplary difference configuration.

FIG. 5D is a diagram of an exemplary difference network configuration 500*d*. The network configuration management system 180 of FIG. 1 generates the difference network configuration 500*d* based on the current network configuration 500*b* in FIG. 5B and the proposed network configuration 500*c* in FIG. 5C. The difference between the configurations can be, for example, generated based on a character by character comparison of the configurations, a word by word comparison of the configuration, a semantic comparison of the configurations, and/or any type of compare technique.

The difference network configuration 500*d* includes a delta 540*d* of the current network configuration 500*b* and the proposed network configuration 500*c*. The delta 540*d* includes a remote router difference 510*d*, a main router difference 520*d*, and an ISDN backup circuit difference 530*d*. The remote router difference 510*d* includes an action for the remote router configuration (in this example, the action is modify which indicates that the remote router configuration is modified), interface configuration 512*d*, an action for the interface configuration (in this example, the action is create which indicates that the interface Bri0 is created in the configuration for the remote router), and values for attributes 514*d* associated with the interface. The values for the attributes 514*d* include old values and new values (in this example, the old value for IP address is EMPTY and the new value for IP address is 131.108.157.1). The network configuration management system 180 can, for example, use the values for the attributes 514*d* in the generation of the device configuration file for the remote router.

The main router difference 520*d* includes an action for the main router configuration (in this example, the action is modify which indicates that the main router configuration is modified), interface configuration 522*d*, an action for the interface configuration (in this example, the action is create which indicates that the interface Bri0 is created in the configuration for the main router), and values for attributes 524*d* associated with the interface. The values for the attributes 524*d* include old values and new values (in this example, the old value for IP address is EMPTY and the new value for IP address is 131.108.157.2). The network configuration management system 180 can, for example, use the values for the attributes 524*d* in the generation of the device configuration file for the main router.

The ISDN backup circuit difference 530*d* includes an action for the backup circuit configuration (in this example, the action is create which indicates that the backup circuit configuration is created) and values for attributes 534*d* associated with the backup circuit connection. The values for the attributes 534*d* include old values and new values (in this example, the old value for connection speed is EMPTY and the new value for connection speed is 56). The network configuration management system 180 can, for example, use the values for the attributes 534*d* in the generation of the device configuration file for the main router and/or in the generation of the device configuration file for the remote router.

Figure 5E:
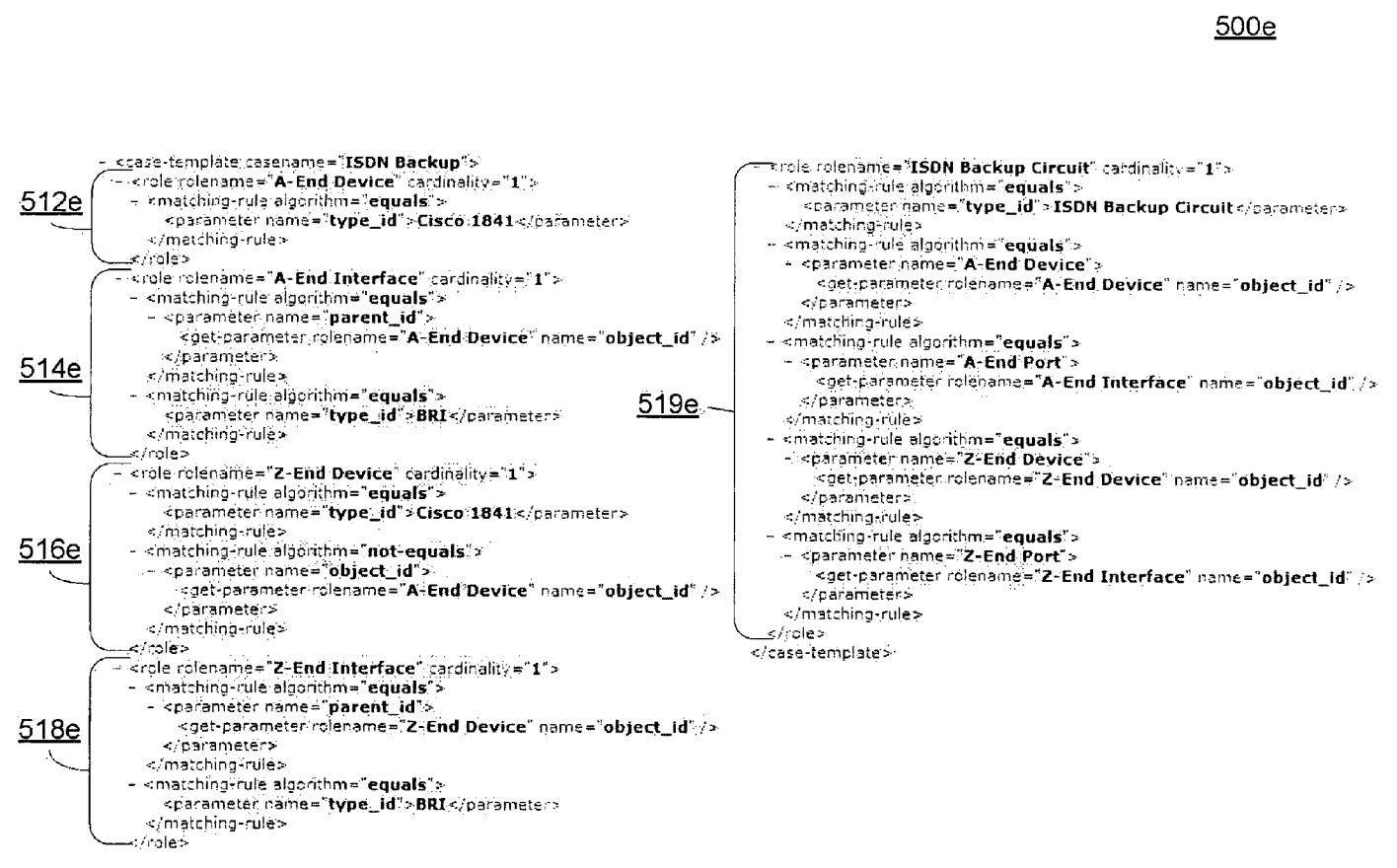

FIG. 5E is an exemplary network change case identification template 500*e*. The network change case identification template 500*e* includes a plurality of roles 512*e*, 514*e*, 516*e*, 518*e*, and 519*e*. The network configuration management system 180 matches each of the roles 512*e*, 514*e*, 516*e*, 518*e*, and 519*e* with one or more of the roles in the difference network configuration 500*d*. In this example, the role 512*e*, "A-End Device," matches the role, "A-End Device," included in the values for the attributes 534*d* of the ISDN backup circuit difference 530*d*. As a further example, the role 519*e*, "ISDN Backup Circuit," matches the role, "ISDN Backup Circuit," of the ISDN backup circuit difference 530*d*. The network configuration management system 180 identifies a network change case based on these role matches (in this example, the network change case is ISDN Backup). The network change case identification template 500*e* can, for example, the network change case as a set of interrelated role (in this example, A-End Device and Z-End Device; ISDN Backup Circuit references A-End and Z-End network devices).

In some examples, the network configuration management system 180 matches the roles in the difference network configuration 500*d* with the roles in a plurality of network change case identification templates. Table 1 illustrates the matching of roles between the difference network configuration 500*d* and a plurality of network change case identification templates. The matches can be, for example, exact matches (e.g., character to character matches, word to word matches, etc.) and/or can be substantially similar matches (e.g., characters match but extra spaces and/or punctuation, first characters match, etc.).

TABLE 1

Exemplary Role Matches

| Role | Difference Network Configuration Role | Network Change Case Identification Template/Role | Result |
|---|---|---|---|
| A-End Device | Cisco 1841 | ISDN Backup/Cisco 1841 | Match |
|  | Cisco 1841 | LAN Primary/Cisco 3600 | No Match |
|  | Cisco 1841 | T1 Backup/Cisco 3600 | No Match |
|  | Cisco 1841 | ISDN Primary/Nortel 8600 | No Match |
| A-End Interface | Bri | ISDN Backup/Bri | Match |
|  | Bri | LAN Primary/Eth | No Match |

TABLE 1-continued

Exemplary Role Matches

| Role | Difference Network Configuration Role | Network Change Case Identification Template/Role | Result |
|---|---|---|---|
|  | Bri | T1 Backup/Eth | No Match |
|  | Bri | ISDN Primary/Bri | Match |

FIG. 5F is an exemplary network change case application template 500*f*. The network change case application template 500*f* includes a plurality of actions 512*f* and 514*f*. The network configuration management system 180 selects the network change case application template 500*f* from one or more network change case application templates stored in a storage device based on the identified network change case (in this example, the identified network change case is ISDN Backup and the network change case application template is ISDN Backup). The network configuration management system 180 utilizes the plurality of actions 512*f* and 514*f* to generate the device configuration files and/or select configuration file templates. The network change case application template 500*f* can be, for example, utilized to define the same activation template, the same network devices, and/or the same required parameters for all instances of the identified network change case.

In some examples, the network change case application template 500*f* includes a set of one or more interrelated roles for one or more sub-networks, one or more network devices (e.g., the primary and secondary network devices perform failover, etc.), and/or one or network components (e.g., every backup connection includes a primary connection, every activated network interface includes a network address, etc.).

FIG. 5G is an exemplary configuration file template 500*g*. The configuration file template 500*g* includes content 510*g* and one or more attributes 512*g*. The one or more attributes 512*g* indicate what values are needed for the device configuration file (in this example, a value for BRI Interface.Subnet Mask is needed for the device configuration file). The network configuration management system 180 selects the configuration file template 500*g* based on the difference network configuration 500*d* and/or the network change case application template 500*f*. In this example, the network change case application template 500*f* includes template="Cisco ISDN." Based on this information, the network configuration management system 180 selects the configuration file template 500*g* that is associated with Cisco ISDN configuration.

FIG. 5H is an exemplary device configuration file 500*h* for a remote router, and FIG. 5I is a diagram of an exemplary device configuration file 500*i* for a main router. The network configuration management system 180 utilizes the configuration file template 500*g*, the difference network configuration 500*d*, and/or the network change case application template 500*f* to generate the device configuration files 500*h* and 500*i*.

In this example, the network configuration, management system 180 iterates through the network change case application template 500*f* to generate devices configuration files 500*h* and 500*i* for the A-End Device, branch1, and the Z-End Device, main, respectively. For the A-End Device, branch1, the network configuration management system 180 determines the attributes 512*g* of the configuration file template 500*g* (in this example, an attribute is BRI Interface.Subnet Mask).

The network configuration management system 180 determines a value for each of the attributes 512g (in this example, the value for the attribute BRI Interface.Subnet Mask for the A-End Device is the new value for the subnet mask of the interface Bri0 512d of the remote router 510d in the difference network configuration 500d—BRI Interface.Subnet Mask=255.255.255.0). The network configuration management system 180 iterates through all of the attributes in the configuration file template 500g and determines a value for each of the attributes based on the difference network configuration 500d.

In other examples, the network configuration management system 180 determines a value for an attribute based on the current network configuration 500b. For example, the configuration file template 500g required the subnet mask for all existing interfaces.

Figure 6A:
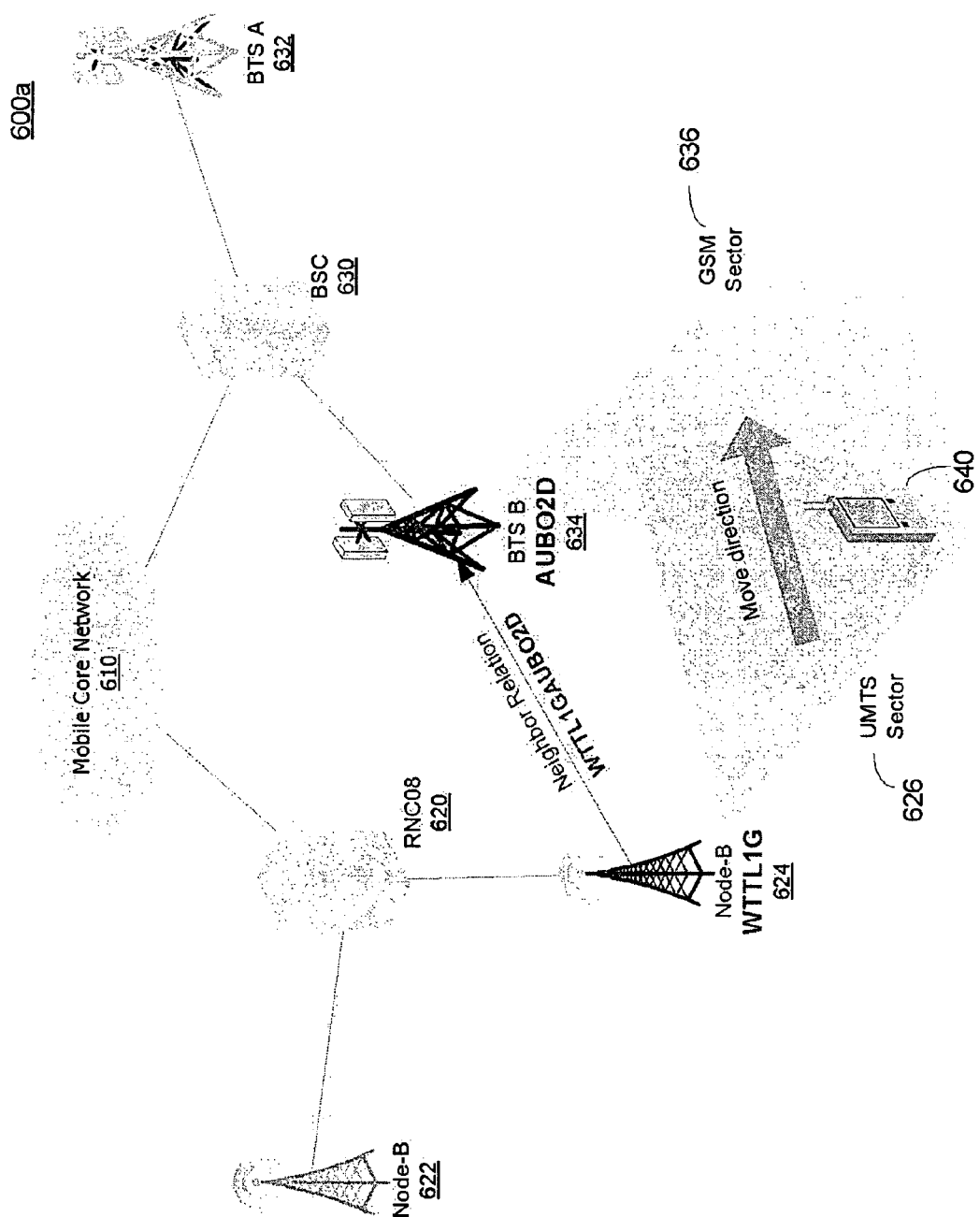
FIG. 6A is a diagram of another exemplary network.

FIG. 6A is a diagram of another exemplary network 600a. The network 600a includes a mobile core network 610, a radio network controller (RNC08) 620, a base station controller (BSC) 630, and a mobile device 640. The RNC08 620 is connected to a node-B 622 and a node-B 624. The node identification of node-B 624 is WTTL1G. The BSC 630 is connected to a base transceiver station A (BTS) 632 and BTS B 634. The station identification of BTS B 634 is AUBO2D. The network 600a includes a universal mobile telecommunication system (UMTS) sector 626 and a global system for mobile communication (GSM) sector 636. In this example, the mobile device 640 moves from the UMTS sector 626 to the GSM sector 636 and the communication to the mobile core network 610 is transferred from the node-B 624 to the BTS B 634. In this example, the generated network configuration enables the handover of the mobile device 640 as the mobile device 640 moves from the UMTS sector 626 to the GSM sector 636 (in other words, the generated network configuration enables the neighbor relationship WTTL1GAUBO2D between the node-B 624 and the BTS B 634).

FIG. 6B is another exemplary network change case identification template 600b. The network change case identification template 600b includes a plurality of roles 612b, 614b, 616b, and 618b. The network configuration management system 180 matches each of the roles 612b, 614b, 616b, and 618b with one or more of the roles in the difference network configuration. The network configuration management system 180 identifies a network change case based on these role matches (in this example, the network change case is New Cell Relation).

In some examples, the network configuration management system 180 determines that the role 618b is optional. The network configuration management system 180 can determine that the role 618b is optional based on information within the role definition (in this example, cardinality="0 . . . 1" indicates that the role is optional).

FIG. 6C is another exemplary network change case application template 600c. The network change case application template 600c includes a plurality of actions 612c, 614c, and 616c. The network configuration management system 180 selects the network change case application template 600c from one or more network change case application templates stored in a storage device based on the identified network change case (in this example, the identified network change case is New Cell Relation and the network change case application template is New Cell Relation). The network configuration management system 180 utilizes the plurality of actions 612c, 614c, and 616c to select configuration file templates and/or generate the device configuration files. In this example, the actions include activation of a direct relation 612c, creation of a back relation 614c, and activation of the back relation 616c.

FIG. 6D is an exemplary configuration file template 600d for a GSM network device. The configuration file template 600d includes envelope parts 612d and structure 614d. The envelope parts 612d includes a header 622d, content for external GSM cell 624d, content for UTRAN cell 626d, and a footer 628d. The structure 614d includes corresponding data for the envelope parts 612d. The structure 614d includes one or more attributes that indicate what values are needed for the device configuration file (in this example, an attribute is <RNC name>). The network configuration management system 180 selects the configuration file template 600d based on the difference network configuration and/or the network change case application template 600c. In this example, the network change case application template 600c includes template="New Ericsson Cell Relation." Based on this information, the network configuration management system 180 selects the configuration file template 600d that is associated with New Ericsson Cell Relation configuration.

FIG. 6E is an exemplary device configuration file 600e for the GSM network device. The network configuration management system 180 utilizes the configuration file template 600d, the difference network configuration, and/or the network change case application template 600c to generate the device configuration files 600e. The network configuration management system 180 determines a value for each of the attributes in the configuration file template 600d and modifies the configuration file template 600d to insert the respective value (in this example, a value 610e, RNC08, is inserted into the attribute <RNC name> of the configuration file template 600d).

FIG. 6F is an exemplary configuration file template 600f for an UMTS network device. The configuration file template 600f includes envelope parts 612f and structure 614f. The envelope parts 612f includes a header 622f, content for UTRAN_CELL type 624f, content for UTRAN_NREL type 626f, and a footer 628f. The structure 614f includes corresponding data for the envelope parts 612f. The corresponding data for the envelope parts 612f includes one or more attributes that indicate that values are needed for the device configuration file (in this example, an attribute is <relation id in Ericsson-OSS>). The network configuration management system 180 selects the configuration file template 600f based on the difference network configuration and/or the network change case application template 600c. In this example, the network change case application template 600c includes template="New Ericsson Cell Relation" and the difference network configuration includes an UMTS network device. Based on this information, the network configuration management system 180 selects the configuration file template 600f that is associated with New Ericsson Cell Relation configuration.

FIG. 6G is an exemplary device configuration file 600g for the UMTS network device. The network configuration management system 180 utilizes the configuration file template 600f, the difference network configuration, and/or the network change case application template 600c to generate the device configuration files 600g. The network configuration management system 180 determines a value for each of the attributes in the configuration file template 600f and modifies the configuration file template 600f to insert the respective value (in this example, a value, 24:HOEF1G PG, is inserted into the attribute <relation id in Ericsson-OSS> of the configuration file template 600g.

In some examples, the device configuration file 600g includes instructions (e.g., a line, multiple lines, configuration options, etc.) that are not included within the configuration file template 600f (in this example, RNCID, CELL_NAME, etc.). The additional instructions can, for example, include repeatable instructions, optional instructions, and/or any other type of instructions. The additional instructions can, for example, be included based on standard configuration options for a managed network (e.g., all errors are reported to a centralized error log server, all dial-up network connections include a default time-out, etc.), references to other device configuration files, and/or any other source for configuration instructions for network devices.

In other examples, the network configuration management system 180 modifies the sequence of instructions in the configuration file template 600f during the generation of the device configuration file 600g based on standard configuration options for a managed network (e.g., activate a primary network device before a secondary network device, etc.) and/or other configuration options in any of the templates described herein.

Figure 7A:
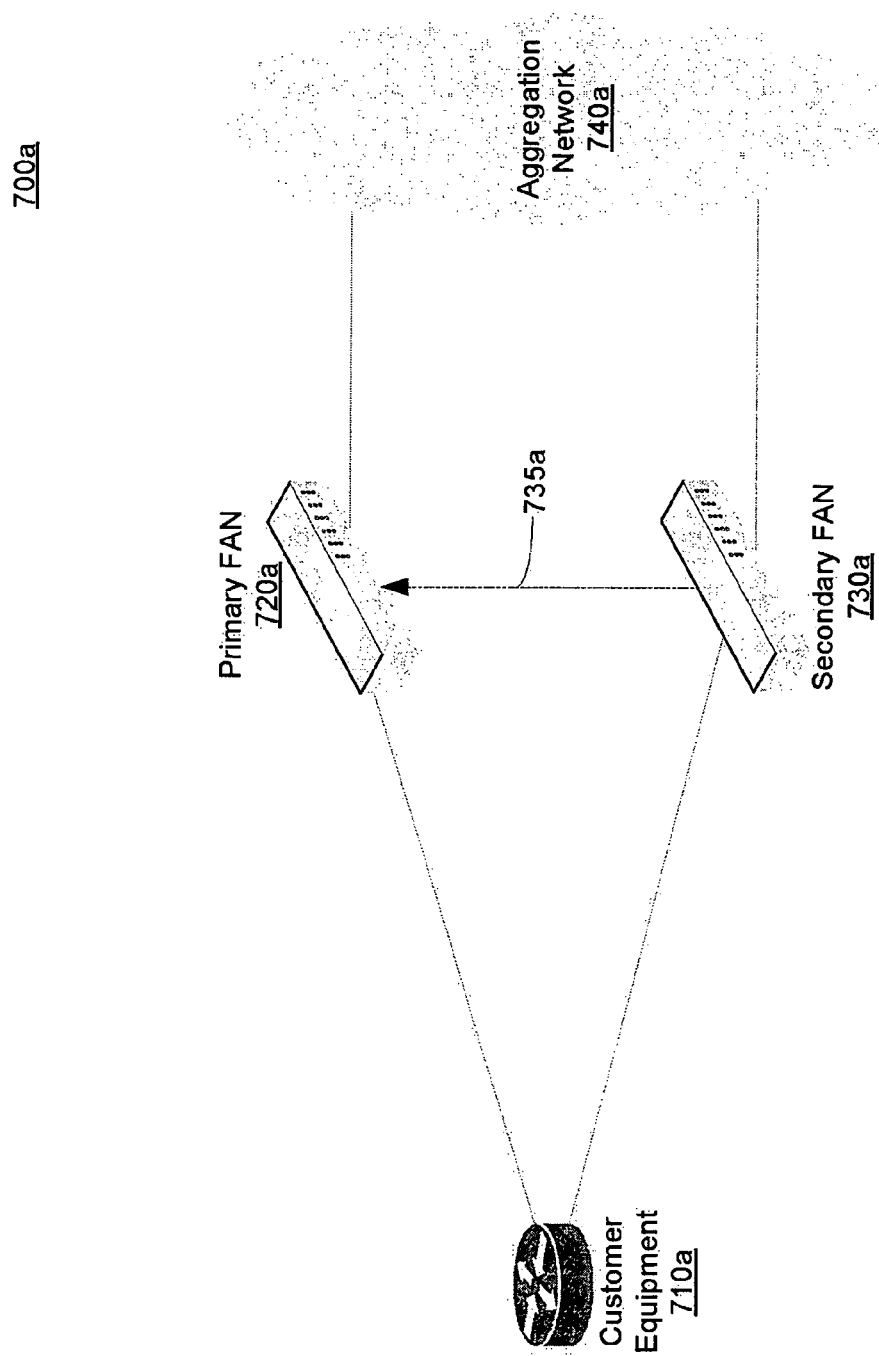
FIG. 7A is a diagram of another exemplary network.

FIG. 7A is a diagram of another exemplary network 700a. The network 700a includes customer equipment 710a, a primary fiber access node (FAN) 720a, a secondary FAN 730a, and an aggregation network 740a. The customer equipment 710a is connected to the aggregation network 740a via the primary FAN 720a and the secondary FAN 730a. The secondary FAN 730a is connected to the primary FAN 720a via a backup connection 735a (e.g., direct ethernet connection, fiber optic connection, etc.). The network configuration management system 180 can generate device configuration files for the primary FAN 720a and/or the secondary FAN 730a. In this example, the device configuration files can upgrade the firmware on the primary FAN 720a and the secondary FAN 730a in sequence—the primary FAN 720a first and then the secondary FAN 730a. Further, in this example, the device configuration files for the primary FAN 720a and/or the secondary FAN 730a are new files that replace the existing device configuration files utilized by the primary FAN 720a and the secondary FAN 730a, respectively. In other words, in this example, the network configuration management system 180 does not parse and convert the existing device configuration files, but generated new device configuration files for the primary FAN 720a and/or the secondary FAN 730a.

Figure 7B:
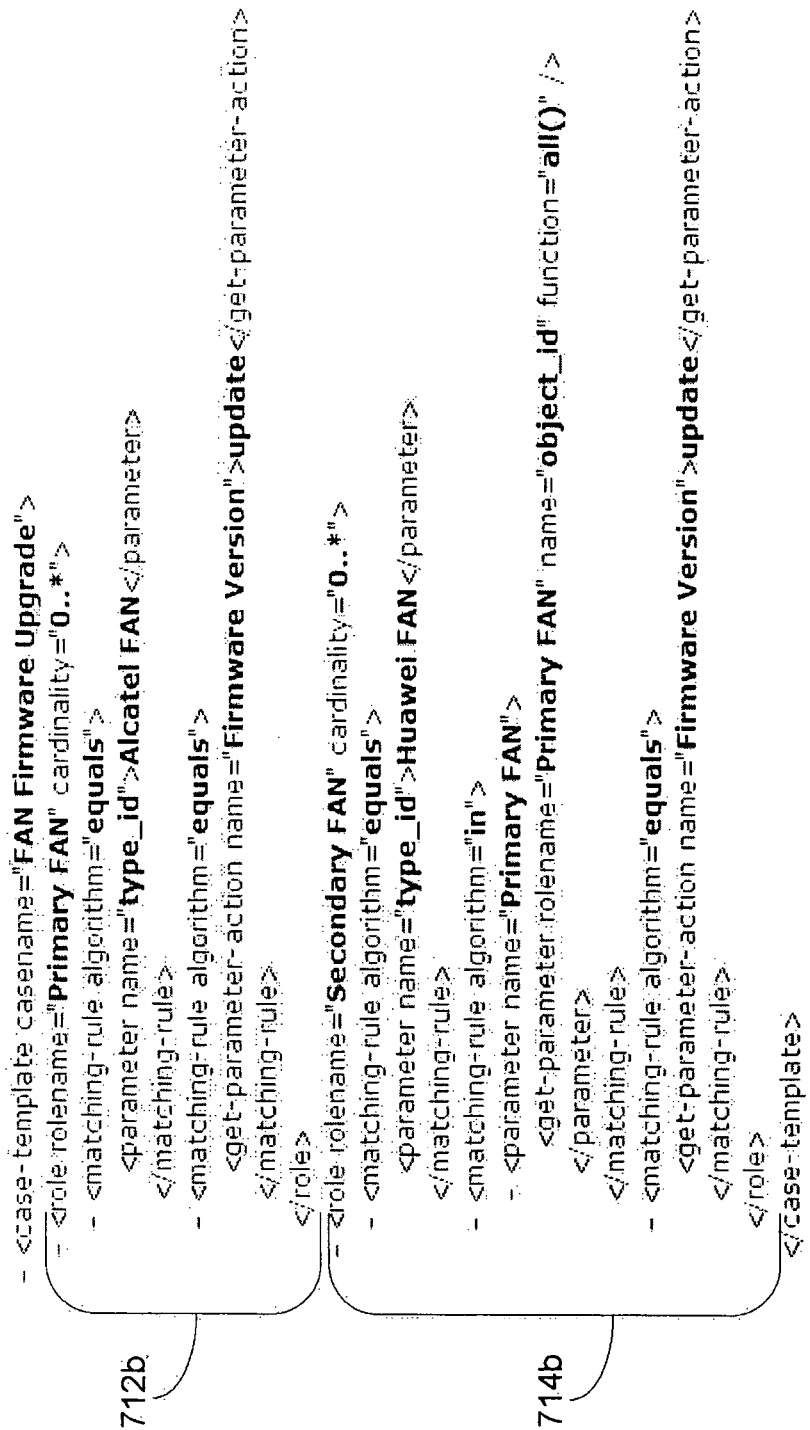
FIG. 7B is another exemplary network change case identification template.

FIG. 7B is another exemplary network change case identification template 700b. The network change case identification template 700b includes a plurality of roles 712b and 714b. The network configuration management system 180 matches each of the roles 712b and 714b with one or more of the roles in the difference network configuration. The network configuration management system 180 identifies a network change case based on these role matches (in this example, the network change case is FAN Firmware Upgrade). Table 2 illustrates an exemplary difference network configuration generated by the network configuration management system 180 for the network 700a.

TABLE 2

Exemplary Difference Network Configuration

| Network Device | Firmware Version | |
|---|---|---|
| | Old Value | New Value |
| Primary FAN 1 | 1.6 | 1.7 |
| Secondary FAN 1 | 2.7 | 2.8 |
| Primary FAN 2 | 1.4 | 1.7 |

TABLE 2-continued

Exemplary Difference Network Configuration

| Network Device | Firmware Version | |
|---|---|---|
| | Old Value | New Value |
| Secondary FAN 2 | 2.7 | 2.8 |
| Primary FAN 3 | 1.4 | 1.7 |
| Secondary FAN 3 | 2.6 | 2.8 |

FIG. 7C is an exemplary network change case application template 700c. The network change case application template 700c includes a plurality of actions 712c, 714c, 716c, and 718c. Although the network change case application template 700c illustrates several parameters, the network change case application template 700c can, for example, include other parameters (e.g., gateway-IP-addr, netmask, FAN-IP-addr, IOS_Image_Filename, etc.). The network configuration management system 180 selects the network change case application template 700c from one or more network change case application templates stored in a storage device based on the identified network change case (in this example, the identified network change case is FAN Firmware Upgrade and the network change case application template is FAN Firmware Upgrade). The network configuration management system 180 utilizes the plurality of actions 712c, 714c, 716c, and 718c to select configuration file templates and/or generate the device configuration files. In this example, the actions include activation of the primary FAN with an Alcatel FAN Firmware Upgrade template 712c, activation of the primary FAN with an Alcatel FAN Full Config template 714c, activation of the secondary FAN with a Huawei FAN Firmware Upgrade template 716c, and activation of the secondary FAN with a Huawei FAN Full Config template 718c.

FIG. 7D is an exemplary configuration file template 700d for the primary FAN 720a. The configuration file template 700d includes content (in this example, the content includes "configure mstp general disable-stp") and one or more attributes (in this example, the attributes include netmask). The one or more attributes indicate that values are needed for the device configuration file (in this example, a value for netmask is needed for the device configuration file). The network configuration management system 180 selects the configuration file template 700d based on the difference network configuration and/or the network change case application template 700c. In this example, the network change case application template 700c includes template="Alcatel FAN Firmware Upgrade." Based on this information, the network configuration management system 180 selects the configuration file template 700d that is associated with Alcatel FAN Firmware Upgrade configuration.

FIG. 7E is an exemplary configuration file template 700e for the secondary FAN 730a. The configuration file template 700e includes content (in this example, the content includes "vlan 2 standard") and one or more attributes (in this example, the attributes include gateway_IP-addr). The one or more attributes indicate that values are needed for the device configuration file (in this example, a value for gateway_IP-addr is needed for the device configuration file). The network configuration management system 180 selects the configuration file template 700e based on the difference network configuration and/or the network change case application template 700c. In this example, the network change case application template 700c includes template="Huawei FAN Firmware Upgrade." Based on this information, the network configuration management system 180 selects the configuration file template 700e that is associated with Huawei FAN Firmware Upgrade configuration.

FIG. 7F is an exemplary device configuration file 700f for the primary FAN 720a. The network configuration management system 180 utilizes the configuration file template 700d, the difference network configuration, and/or the network change case application template 700c to generate the device configuration file 700f for the primary FAN 720a.

FIG. 7G is an exemplary device configuration file 700g for the secondary FAN 730a. The network configuration management system 180 utilizes the configuration file template 700e, the difference network configuration, and/or the network change case application template 700c to generate the device configuration file 700g for the secondary FAN 730a.

Figure 7H:
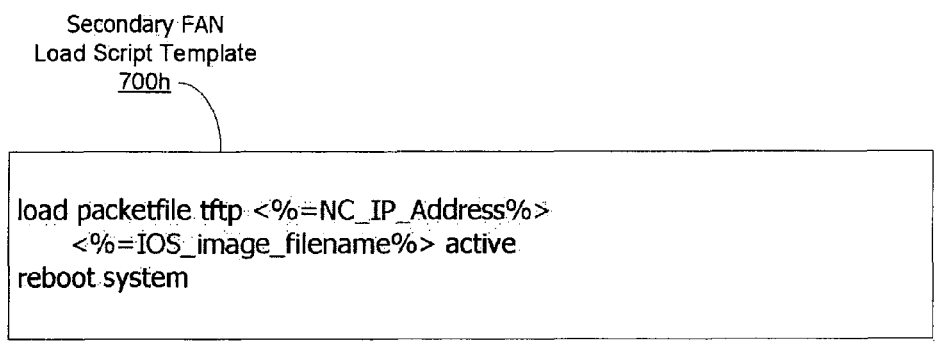
FIG. 7H is an exemplary device configuration load script template for the secondary FAN.

FIG. 7H is an exemplary device configuration load script template 700h for the secondary FAN 730a. The device load script template 700h includes content (in this example, the content includes "reboot system") and one or more attributes (in this example, the attributes include NC_IP_Address and IOS_image_filename). The one or more attributes indicate that values are needed for the device configuration file (in this example, a value for NC_IP_Address and IOS_image_filename is needed for the device configuration file). The network configuration management system 180 selects the device load script template 700h based on the difference network configuration and/or the network change case application template 700c. In this example, the network change case application template 700c includes template="Huawei FAN Full Config." Based on this information, the network configuration management system 180 selects the device load script template 700h that is associated with Huawei FAN Full Config configuration.

Figure 7I:
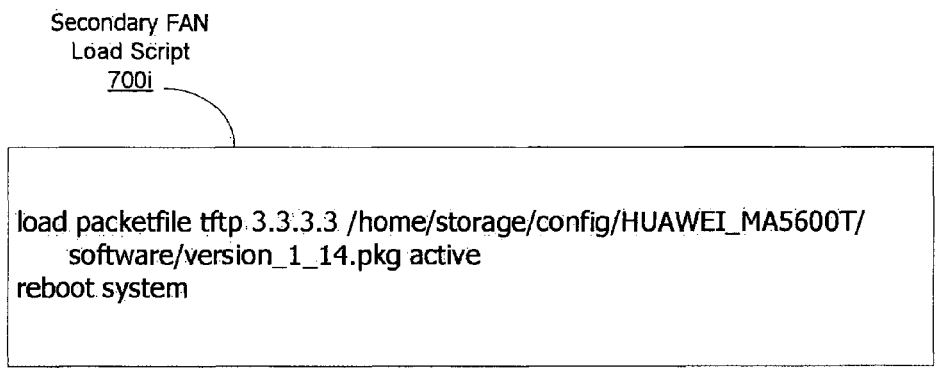
FIG. 7I is an exemplary device configuration load script for the secondary FAN.

FIG. 7I is an exemplary device configuration load script 700i for the secondary FAN 730a. The network configuration management system 180 utilizes the device load script template 700h, the difference network configuration, and/or the network change case application template 700c to generate the device load script 700i for the secondary FAN 730a.

In some examples, according to the application template of FIG. 7C, template "Huawei FAN Firmware Upgrade", the network configuration management system 180 utilizes the device load script 700i to upload the new device configuration image to the secondary FAN 730a. The network configuration management system 180 can also, according to template "Huwei FAN Full Config", send the configuration script 700g to the secondary FAN 730a.

Figure 8:
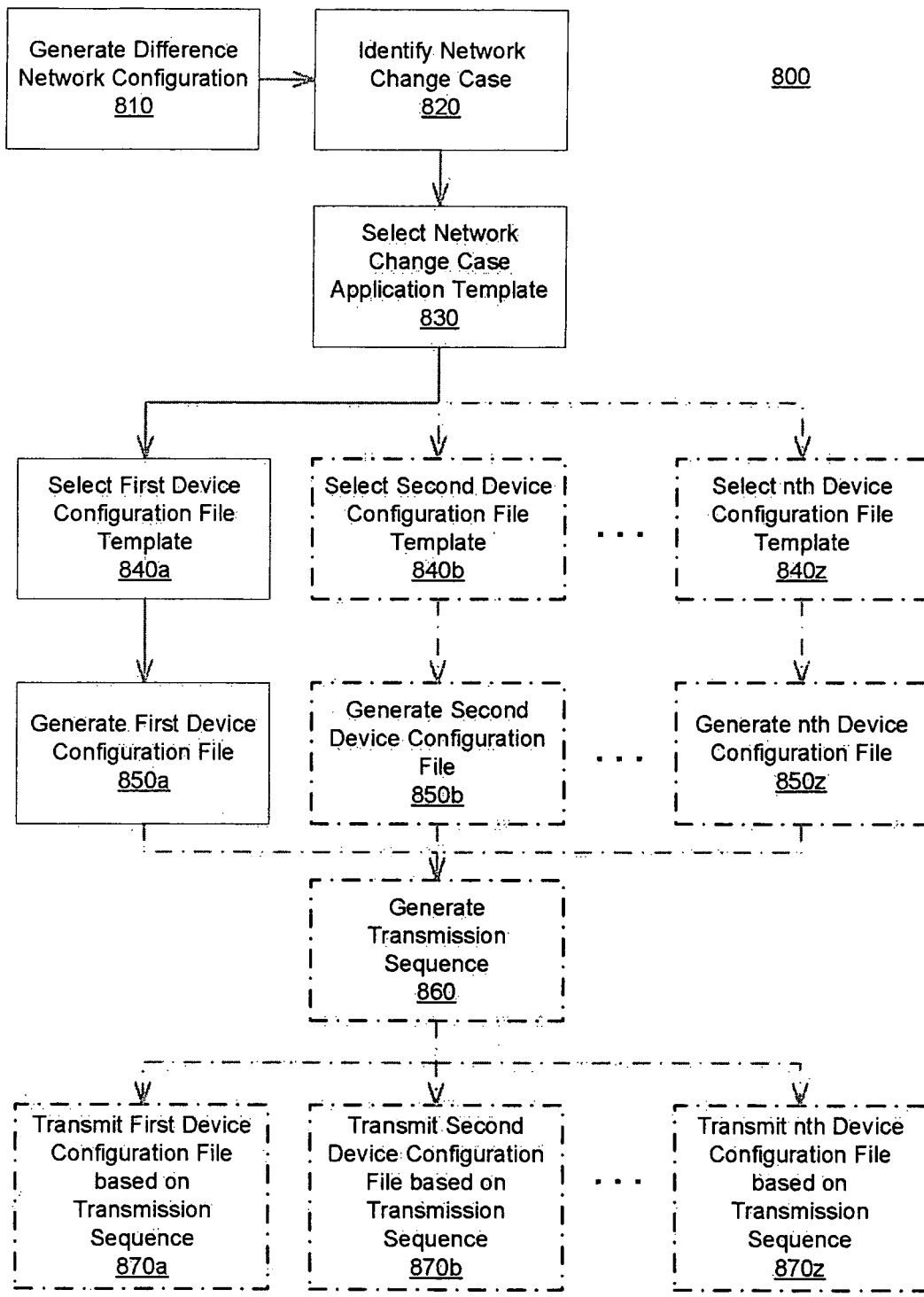
FIG. 8 is a flowchart of another exemplary process for configuration file generation.

FIG. 8 is a flowchart 800 of another exemplary process for configuration file generation utilizing, for example, the network configuration management system 380 of FIG. 3. The difference configuration module 384 generates (810) a difference network configuration for the network 300a based on a current network configuration and a proposed network configuration.

The case identification module 385 identifies (820) a network change case from the difference network configuration based on one or more network change case identification templates. The case application module 386 selects (830) a network change case application template from one or more network change case application templates based on the identified network change case.

The configuration file module 387 selects (840a) a first configuration file template, selects (840b) a second configuration file template through selects (840z) a nth configuration file template based on the difference network configuration and the network change case application template. In some examples, the nth is the number of network devices in the managed network and/or parts of the managed network (for example, all of the network devices in the managed network need to be updated). In other examples, the nth is the number of specific types of network devices in the managed network and/or parts of the managed network (for example, all model XC324 routers in the managed network need their firmware updated).

The configuration file generation module 388 generates (850a) a first device configuration file for a first network device in the difference network configuration based on the difference network configuration, the network change case application template, the current configuration of the network device, and/or the first configuration file template. The configuration file generation module 388 generates (850b) a second device configuration file for a second network device in the difference network configuration based on the difference network configuration, the network change case application template, and the second configuration file template. The configuration file generation module 388 generates (850z) a nth device configuration file for a nth network device in the difference network configuration based on the difference network configuration, the network change case application template, and the nth configuration file template.

The case application module 386 determines (860) a transmission sequence for the device configuration files based on the network change case application template. The communication module 381 transmits (870a, 870b, and 870z) the first, second, and nth device configuration files to respective network devices based on the transmission sequence.

Table 3 illustrates an exemplary upgrade process of all Cisco x43 routers in the company remote network. In this example, the network configuration management system 380 can, for example, upgrade a plurality of network devices based on a single upgrade instruction (e.g., upgrade the firmware for all Cisco x43 routers in the company remote network, etc.). In some examples, the network configuration management system 380 searches through the current network configuration for all Cisco x43 routers and adds change requests for each identified Cisco x43 router to the inventory of proposed changes. In other examples, the difference network configuration for the exemplary upgrade process includes a configuration command with a list of the respective routers for upgrade (e.g., Upgrade Firmware for Office A Router Cisco Ax43, Office B Router Cisco Bx43, etc.).

TABLE 3

Exemplary Upgrade Process

| Network Device/ Network | Difference Network Configuration | Identified Network Change Case | Network Change Case Application Template | Device Configuration File |
|---|---|---|---|---|
| Office A Router Cisco Ax43/ | Upgrade Firmware for | Cisco x43 Firmware | Cisco x43 Firmware | Office A Router Cisco Ax43 |

TABLE 3-continued

Exemplary Upgrade Process

| Network Device/ Network | Difference Network Configuration | Identified Network Change Case | Network Change Case Application Template | Device Configuration File |
|---|---|---|---|---|
| Company Remote Network | Office A Router Ciscow Ax43 | Upgrade | Upgrade | Configuration File |
| Office B Router Cisco Bx43/ Company Remote Network | Upgrade Firmware for Office B Router Cisco Bx43 | Cisco x43 Firmware Upgrade | Cisco x43 Firmware Upgrade | Office B Router Cisco Bx43 Configuration File |
| Office C Router Cisco Cx43/ Company Remote Network | Upgrade Firmware for Office C Router Cisco Cx43 | Cisco x43 Firmware Upgrade | Cisco x43 Firmware Upgrade | Office C Router Cisco Cx43 Configuration File |
| Office D Router Cisco Dx43/ Company Remote Network | Upgrade Firmware for Office D Router Cisco Dx43 | Cisco x43 Firmware Upgrade | Cisco x43 Firmware Upgrade | Office D Router Cisco Dx43 Configuration File |
| Office E Router Cisco Ex43/ Company Remote Network | Upgrade Firmware for Office E Router Cisco Ex43 | Cisco x43 Firmware Upgrade | Cisco x43 Firmware Upgrade | Office E Router Cisco Ex43 Configuration File |
| . . . | . . . | . . . | . . . | . . . |
| Office ZZZ Router Cisco ZZZx43/ Company Remote Network | Upgrade Firmware for Office ZZZ Router Cisco ZZZx43 | Cisco x43 Firmware Upgrade | Cisco x43 Firmware Upgrade | Office ZZZ Router Cisco ZZZx43 Configuration File |

In some examples, the configuration file template includes one or more repeatable parts. The repeatable parts can be, for example, utilized to generate a configuration file for a network device with a plurality of components utilizing a repeatable part. For example, the configuration file template includes a repeatable part for eth interfaces. In this example, during the generation of the configuration file, the part for eth interfaces is utilized for each of the eth interfaces in the network device (e.g., eth0, eth1, eth2, eth3, etc. utilize the same repeatable part in the configuration file template for generation of the respective parts in the configuration file).

In some examples, the combination of the network change case application template and the configuration template enables the generation of the configuration file for related and/or dependent network devices on various levels of granularity (e.g., sub-network, network element, subsystem, network device parameter, etc.). The generation of the configuration file can be, for example, based on the dependencies of the network devices (e.g., functional dependencies, ID-dependencies, entity references, dependencies from network inventory, etc.).

In other examples, the configuration file template includes one or more references to other configuration file template. Each configuration file template can, for example, include one or more references to sub-configuration file templates. For example, the router ABx45 configuration file template includes a first reference to the router x45 configuration file template (in this example, a standard configuration file template for the x45 model router) and a second reference to the router AB configuration file template (in this example, a standard configuration file template for the office AB). As a further example, the router AB configuration file template includes a third reference to the router A configuration file template (in this example, a standard configuration file template for the company A).

In some examples, the device configuration file is a complete configuration file for the network device. In this example, the complete device configuration file can replace the current device configuration file stored on the network device. In other examples, the device configuration file is a partial configuration file for the network device. In this example, the partial device configuration can supplement, be appended to, and/or replace parts of the current device configuration file stored on the network device.

In some examples, the transmission sequence is based on a boot-up sequence for the network devices. In other examples, the transmission sequence includes a first set of network devices for a first time period and a second set of network devices for a second time period. For example, the device configuration files for all primary network devices are set for transmission on day one at 1:00 am and the device configuration files for all secondary network devices are set for transmission on day two at 1:00 am. Table 4 illustrates an exemplary transmission sequence for the first device through nth device.

TABLE 4

Exemplary Transmission Sequence

| Network Device | Configuration File | Time/Date for Transmission |
|---|---|---|
| Company Office A Primary Router | Device Primary Cisco Ax43 Configuration File | Tuesday at 1:10 am |
| Company Office A Secondary Router | Device Secondary Cisco Ax23 Configuration File | Wednesday at 1:10 am |
| Company Office B Primary Router | Device Primary Cisco Bx43 Configuration File | Thursday at 1:10 am |
| Company Office B | Device Secondary Cisco | Friday at 1:10 am |

TABLE 4-continued

Exemplary Transmission Sequence

| Network Device | Configuration File | Time/Date for Transmission |
|---|---|---|
| Secondary Router | Bx33 Configuration File | |
| Company Office C Primary Router | Device Primary Cisco Cx63 Configuration File | Saturday at 1:10 am |
| Company Office C Secondary Router | Device Secondary Cisco Cx43 Configuration File | Sunday at 1:10 am |

Figure 9:
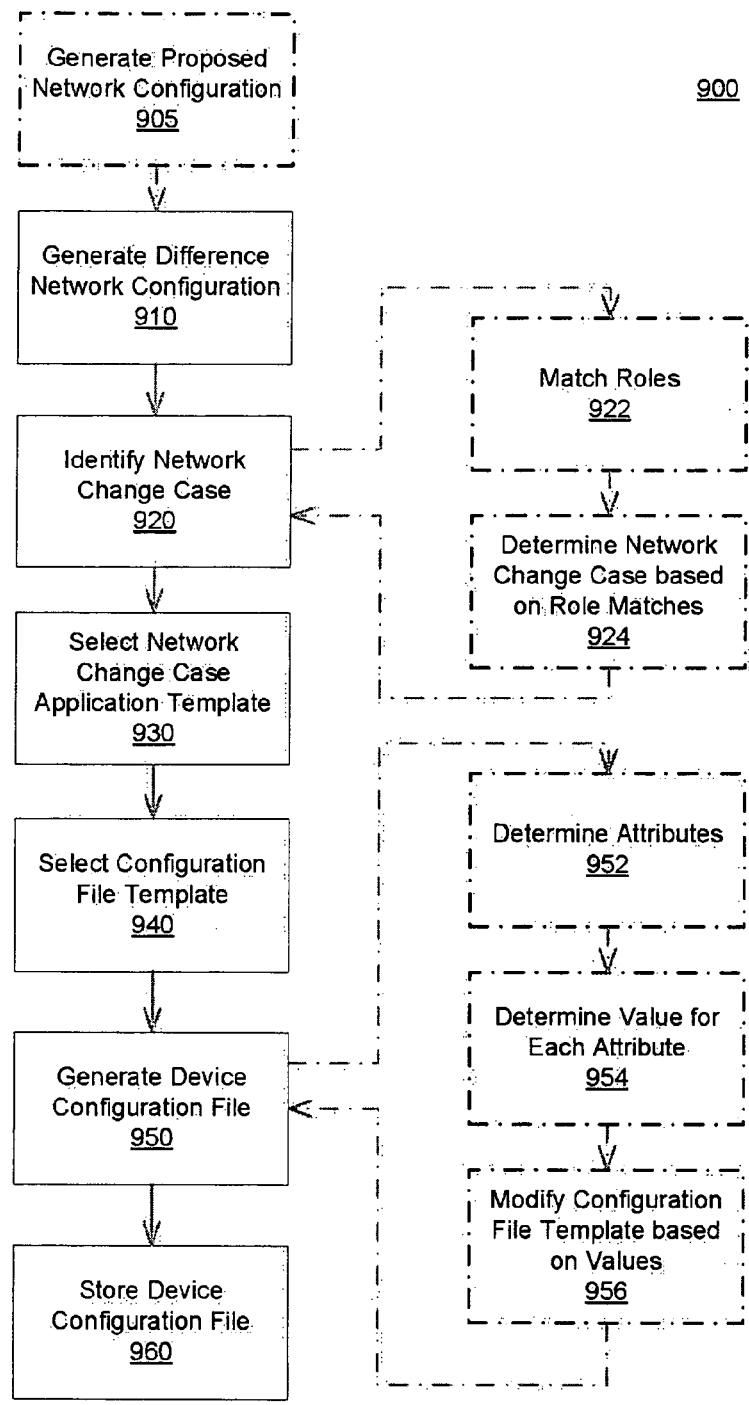
FIG. 9 is a flowchart of another exemplary process for configuration file generation.

FIG. 9 is a flowchart 900 of another exemplary process for configuration file generation utilizing, for example, the network configuration management system 380 of FIG. 3. The proposed configuration module 383 generates (905) the proposed network configuration (e.g., retrieves the proposed network configuration from a proposed network configuration storage device, generates the proposed network configuration based on the configuration change requests, etc.). The difference configuration module 384 generates (910) a difference network configuration for the network 300a based on a current network configuration and the proposed network configuration.

The case identification module 385 identifies (920) a network change case from the difference network configuration based on one or more network change case identification templates.

In other examples, the one or more network change case identification templates are pre-determined by an operator and/or an administrator of an operational support system. The network change case identification template can be indicative of a relationship between one or more network devices.

The case identification module 385 matches (922) at least one role in the difference network configuration with one or more roles in each network change case identification template of the one or more network change case identification templates. The case identification module 385 determines (924) the network change case based on role matches. The roles can be, for example, mandatory roles and/or optional roles. Table 5 illustrates exemplary match analysis between roles in the difference network configuration and roles in the network change case identification template. In this example, the matched network change case is Backup OC-3 since the difference network configuration includes all of the mandatory and optional roles for the network change case.

TABLE 5

Exemplary Match Analysis of Roles

| Network Change Case Identification Template | Match Mandatory Roles in Difference Network Configuration | Percentage Match of Optional Roles |
|---|---|---|
| Backup ISDN | No | NA |
| Backup Frame Rely | Yes | 10% |
| Backup T-1 | Yes | 80% |
| Backup OC-3 | Yes | 100% |
| Backup Dial-Up | No | NA |
| Backup MAN | No | NA |
| Backup WAN | No | NA |

The case application module 386 selects (930) a network change case application template from one or more network change case application templates based on the identified network change case. The configuration file module 387 selects (940) a configuration file template based on the difference network configuration and the network change case application template.

The configuration file generation module 388 generates (950) a device configuration file for a network device in the difference network configuration based on the difference network configuration, the network change case application template, the current configuration of the device, and the configuration file template. The configuration file generation module 388 determines (952) one or more attributes for the device configuration file based on the configuration file template. The configuration file generation module 388 determines (954) one or more values for each of the one or more attributes based on the difference network configuration and/or the current network configuration. The configuration file generation module 388 modifies (956) the configuration file template with the values of the one or more attributes. The modification of the configuration file template can, for example, include overwriting the attributes with the values, adding the values, deleting the attributes, and/or any other type of modification of the configuration file template. The storage device 395 stores (960) the device configuration file.

Figure 10:
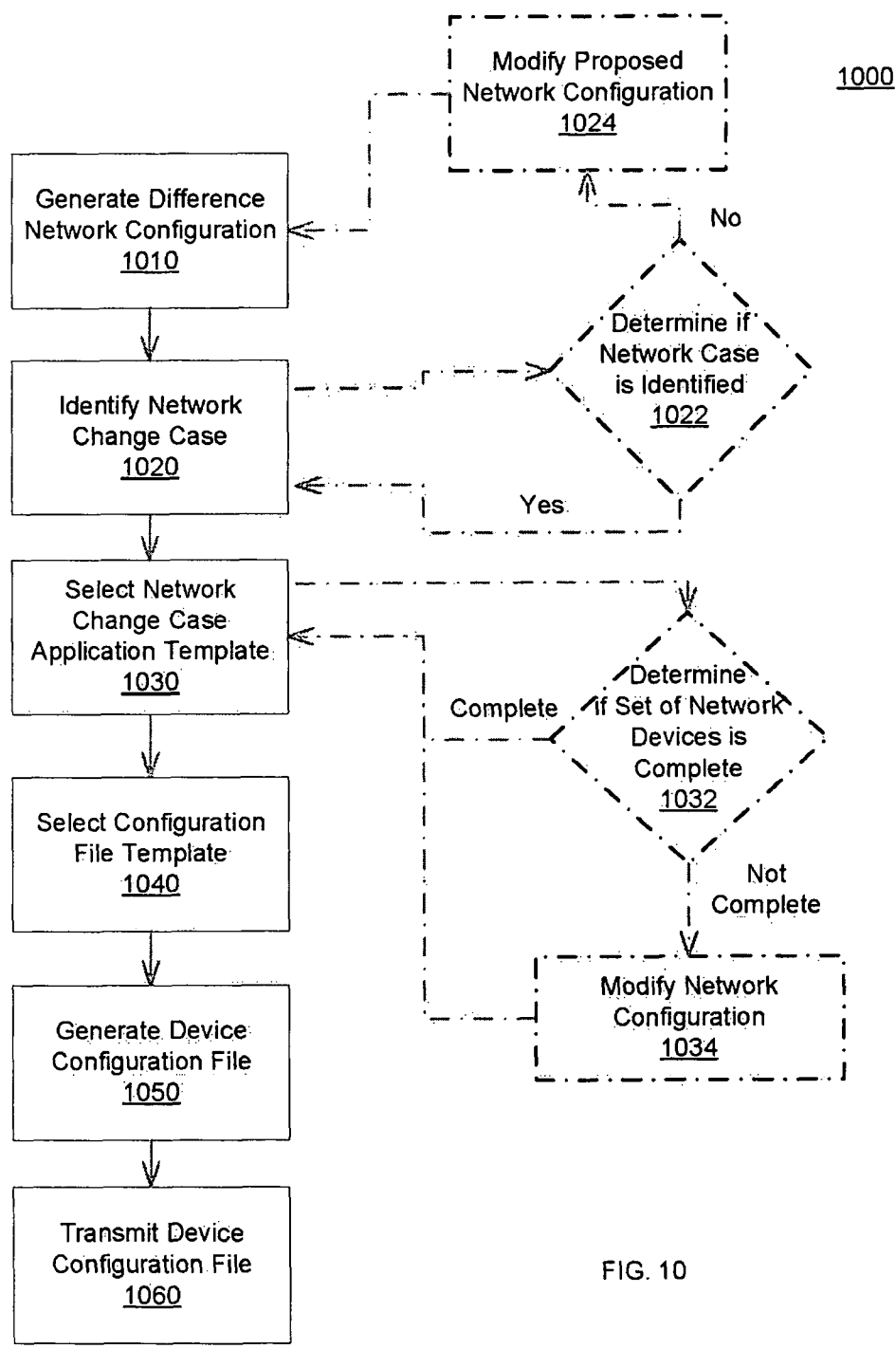
FIG. 10 is a flowchart of another exemplary process for configuration file generation.

FIG. 10 is a flowchart 1000 of another exemplary process for configuration file generation utilizing, for example, the network configuration management system 380 of FIG. 3. The difference configuration module 384 generates (1010) a difference network configuration for the network 300a based on a current network configuration and the proposed network configuration. The case identification module 385 identifies (1020) a network change case from the difference network configuration based on one or more network change case identification templates.

The case identification module 385 determines (1022) if a network change case is identified from the difference network configuration. If a network change case is not identified, the case identification module 285 modifies (1024) the proposed network configuration based on the determination if the network change case is identified and/or one or more network configuration rules. After the proposed network configuration is modified, the difference configuration module 384 generates (1010) another difference network configuration for the network 300a based on the current network configuration and the modified proposed network configuration. The processing continues to step 1020. If a network change case is identified, the processing returns for step 1030.

The case application module 386 selects (1030) a network change case application template from one or more network change case application templates based on the identified network change case. The case application module 386 determines (1032) that each set of the one or more network devices is complete based on the type. If each set of the one or more network devices is complete, the processing continues to step 1040. If each set of the one or more network devices is not complete, the case application module 386 modifies (1034) the proposed network configuration and/or the difference network configuration based on the determination if each of the sets of the one or more network element is complete and one or more network configuration rules. The processing continues to step 1040 with the modified proposed network configuration and/or the modified difference network configuration.

The configuration file module 387 selects (1040) a configuration file template based on the difference network configuration and the network change case application template. The configuration file generation module 388 generates (1050) a device configuration file for a network device in the difference network configuration based on the difference network configuration, the network change case application template, the current network configuration, and/or the configuration file template. The communication module 381 transmits (1060) the device configuration file to the network device.

Figure 11:
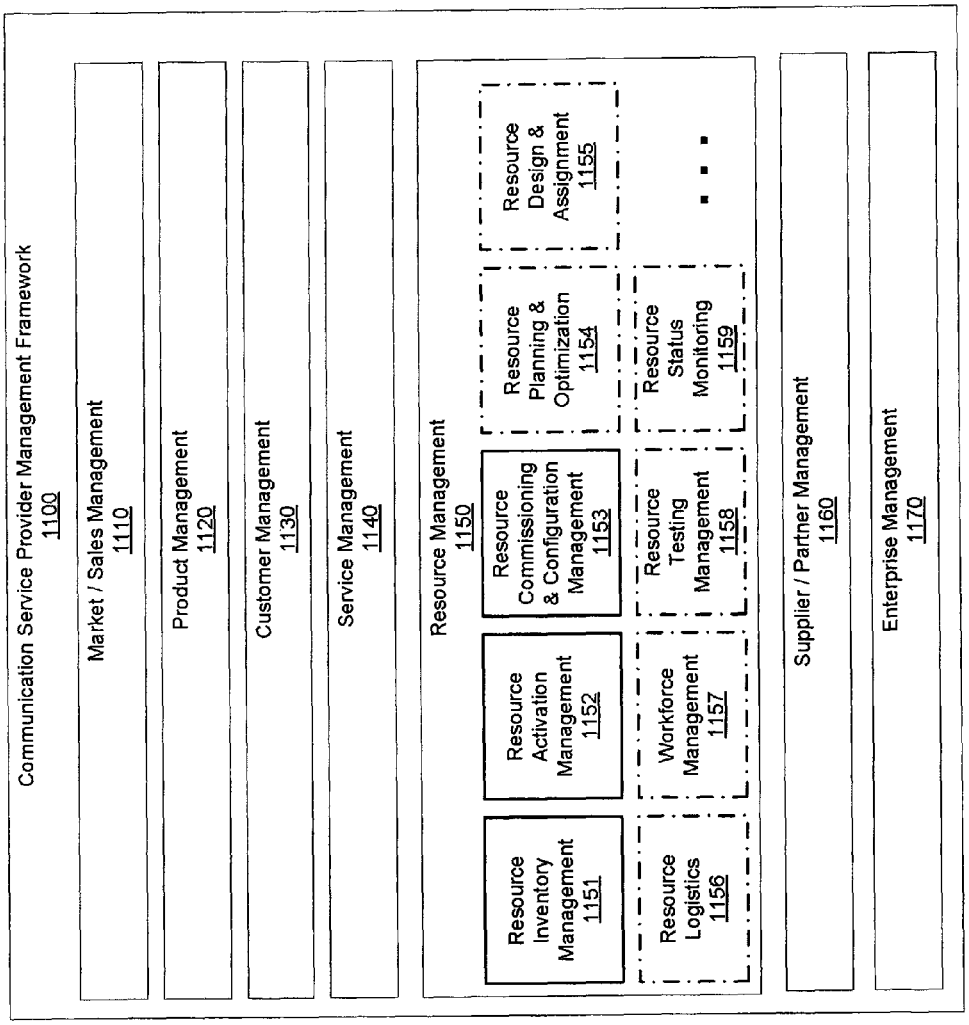
FIG. 11 is a block diagram of an exemplary communication service provider management framework.

FIG. 11 is a block diagram of an exemplary communication service provider (CSP) management framework 1100. The CSP management framework 1100 includes a market/sale management layer 1110, a product management layer 1120, a customer management layer 1130, a service management layer 1140, a resource management layer 1150, a supplier/partner management layer 1160, and an enterprise management layer 1170. The resource management layer 1150 includes a resource inventory management system 1151, a resource activation management system 1152, a resource commissioning and configuration management system 1153, a resource planning and optimization system 1154, a resource design and assignment system 1155, a resource logistics system 1156, a workforce management system 1157, a resource testing management system 1158, a resource status monitoring system 1159, and/or other systems associated with resource management.

The CSP management framework 1100 can utilize the layers and/or systems to provide operational support system functionality to network service providers and/or companies. The resource inventor management system 1151, the resource activation management system 1152, and/or the resource commissioning and configuration management system 1153 can, for example, utilize the network configuration management technology described herein to provide the functionality of each system. For example, the resource activation management system 1152 can utilize the network configuration management technology described herein to manage (e.g., activate, de-activate, update parameters, delete, add, etc.) network devices in a managed network.

In some examples, the CSP management framework 1100 is part of or all of a telecom application map (TAM) (for example, the TAM available from the TeleManagement Forum (TMF) in Morristown, N.J.). The CSP management framework 1100 can, for example, include other layers and/or systems that are part of the TMF TAM.

In other examples, the communication module 381 of FIG. 3A transmits a configuration error notification based on the determination if the network change case is identified. The communication module 381 can transmit any other information and/or data associated with the network configuration management system 380.

In other examples, the current configuration module 382 of FIG. 3A determines the current network configuration from a current configuration storage device. The current configuration storage device can be separate from the storage device and/or a part of the storage device 395.

In some examples, the proposed configuration module 383 of FIG. 3A determines the proposed network configuration from a proposed configuration storage device. The proposed configuration storage device can be separate from the storage device 395 and/or a part of the storage device 395. The proposed configuration module 383 can generate the proposed network configuration based on a plurality of configuration change request.

In some examples, the difference configuration module 384 of FIG. 3A can normalize the difference network configuration based on the one or more network change case identification templates. The difference configuration module 384 can modify the difference network configuration based on one or more network configuration rules. The network configuration management system 380 can store the one or more network configuration rules (e.g., in the storage device 395, in the current configuration storage device, in the proposed configuration storage device, etc.).

In other examples, the case identification module 385 of FIG. 3A matches at least one role in the difference network configuration with one or more roles in each network change case identification template of the one or more network change case identification templates. The case identification module 385 determines the network change case based on role matches.

In some examples, the case identification module 385 can determine if the network change case is identified from the difference network configuration and/or modify the proposed network configuration based on the determination if the network change case is identified and/or one or more network configuration rules. The case identification module 385 can determine if one or more network change cases are identified from the difference network configuration and generates a configuration error notification.

In some examples, the case application module 386 of FIG. 3A determines a transmission sequence for device configuration files based on the network change case application template (e.g., transmit all of the device configuration files at the same time, transmit the device configuration files in a specified sequence, transmit the device configuration files during specified time periods, etc.).

In other examples, the case application module 386 identifies one or more sets of one or more network devices in the difference network configuration (e.g., primary and secondary network devices, etc.) and/or determines a type from a set of types (e.g., optional, required, etc.) for each of the sets of the one or more network devices identified in the difference network configuration.

In some examples, the case application module 386 determines that each of the set of the one or more network devices is complete based on the type (e.g., required set of network devices, only one of the two required network devices, etc.) and/or modifies the proposed network configuration based on the determination if each of the sets of the one or more network element is complete and one or more network configuration rules (e.g., adds the back relationship to a transfer between networks, etc.).

In some examples, the configuration file module 387 of FIG. 3A selects the configuration file template based on the difference network configuration, the network change case application template, the network device in the difference network configuration, and/or the current network configuration.

In other examples, the configuration file generation module 388 of FIG. 3A can generate the device configuration file for the first network device in the difference network configuration based on the difference network configuration, the network change case application template, the first configuration file template, and/or the current network configuration.

In some examples, the configuration file generation module 388 determines one or more attributes for the device configuration file based on the configuration file template. The configuration file generation module 388 can determine one or more values for each of the one or more attributes based on the difference network configuration. The configuration file generation module 388 can modify the first configuration file template with the values of the one or more attributes.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose logic circuitry. The circuitry can, for example, be a FPGA (field programmable gate array) and/or an ASIC (application-specific integrated circuit). Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

Any of the systems described herein can include clients and servers. A client and a server are generally remote from each other and typically interact through a communication network. The relationship of client and server arises by virtue of computer programs running on the respective computers and having a client-server relationship to each other.

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, bluetooth, code-division multiple access (CDMA) network, time division multiple access (TDMA) network, global system for mobile communications (GSM) network), and/or other circuit-based networks.

The network device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Microsoft® Internet Explorer® available from Microsoft Corporation, Mozilla® Firefox available from Mozilla Corporation). The mobile computing device includes, for example, a personal digital assistant (PDA).

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

What is claimed is:

1. A computer implemented method for network configuration management, the method comprising:
    comparing a current network configuration to a proposed network configuration;
    generating a difference network configuration for a managed network based on the comparison of the current network configuration and the proposed network configuration;

identifying a network change case based on the difference network configuration and using one or more network change case identification templates, the identifying comprising matching a role in the difference network configuration with a role in a network change case identification template of the one or more network change case identification templates; and determining the network change case based on the role match;

selecting a network change case application template from one or more network change case application templates based on the identified network change case;

selecting a first configuration file template based on the difference network configuration and the network change case application template;

generating a first device configuration file for a first network device in the difference network configuration based on the difference network configuration, the network change case application template, and the first configuration file template; and storing the first device configuration file in a first storage device.

2. The method of claim 1, further comprising transmitting the first device configuration file to the first network device.

3. The method of claim 1, further comprising:
selecting a second configuration file template based on the difference network configuration and the network change case application template;

generating a second device configuration file for a second network device in the difference network configuration based on the difference network configuration, the network change case application template, and the second configuration file template; and storing the second device configuration in a second storage device.

4. The method of claim 3, further comprising transmitting the second device configuration file to the second network device.

5. The method of claim 3, further comprising:
determining a transmission sequence for the first device configuration file and the second device configuration file based on the network change case application template;

transmitting the first device configuration file to the first network device based on the transmission sequence; and transmitting the second configuration file to the second network device based on the transmission sequence.

6. The method of claim 1, wherein the network change case being indicative of an association between the first network device and a second network device in the managed network.

7. The method of claim 1, wherein each network change case identification template of the one or more network change case identification templates comprising a set of one or more interrelated roles for one or more sub-networks, one or more network devices, one or more network components, or any combination thereof.

8. The method of claim 1, wherein the selecting the first configuration file template further comprising selecting the first configuration file template based on the difference network configuration, the network change case application template, and the first network device in the difference network configuration.

9. The method of claim 1, further comprising:
identifying one or more sets of one or more network devices in the difference network configuration; and
determining a type from a set of types for each of the sets of one or more network devices identified in the difference network configuration.

10. The method of claim 9, further comprising:
determining if each of the sets of one or more network devices is complete based on the type; and
modifying the proposed network configuration based on the determination if each of the sets of one or more network elements is complete and one or more network configuration rules.

11. The method of claim 1, further comprising:
determining the current network configuration from a current configuration storage device; and
determining the proposed network configuration from a proposed configuration storage device.

12. The method of claim 1, wherein the first configuration file template comprising a header, one or more content parts, a footer, or any combination thereof.

13. The method of claim 1, wherein the first configuration file template comprising at least one reference to another configuration file template.

14. The method of claim 1, wherein the first configuration file template comprising one or more optional sections, the one or more optional sections comprising information indicative of an optional status.

15. The method of claim 1, wherein the first device configuration file comprising a partial configuration file for the first network device.

16. The method of claim 1, wherein the generating the first device configuration file for the first network device in the difference network configuration further comprising generating the first device configuration file for the first network device in the difference network configuration based on the difference network configuration, the network change case application template, the first configuration file template, and the current network configuration.

17. The method of claim 1, wherein the generating the first device configuration file for the first network device in the difference network configuration further comprising:
determining one or more attributes for the first device configuration file based on the first configuration file template;
determining one or more values for each of the one or more attributes based on the difference network configuration; and
modifying the first configuration file template with the values of the one or more attributes.

18. The method of claim 1, further comprising normalizing the difference network configuration based on the one or more network change case identification templates.

19. The method of claim 18, wherein the normalizing the difference configuration further comprising modifying the difference network configuration based on one or more network configuration rules.

20. The method of claim 19, further comprising storing the one or more network configuration rules in a network configuration management system.

21. The method of claim 1, further comprising:
determining if the network change case is identified from the difference network configuration; and
modifying the proposed network configuration based on the determination if the network change case is identified and one or more network configuration rules.

22. The method of claim 1, further comprising:
determining if one or more network change cases are identified from the difference network configuration; and
transmitting a configuration error notification based on the determination if the network change case is identified.

23. The method of claim 1, further comprising generating the proposed network configuration based on a plurality of configuration change requests.

24. A computer program product, tangibly embodied on a non-transitory information carrier, the computer program product comprising:
instructions for comparing a current network configuration to a proposed network configuration;
instructions for generating a difference network configuration for a managed network based on the comparison of the current network configuration and the proposed network configuration;
instructions for identifying a network change case based on the difference network configuration and using one or more network change case identification templates, the identifying comprising matching a role in the difference network configuration with a role in a network change case identification template of the one or more network change case identification templates; and determining the network change case based on the role match;
instructions for selecting a network change case application template from one or more network change case application templates based on the identified network change case;
instructions for selecting a first configuration file template based on the difference network configuration and the network change case application template;
instructions for generating a first device configuration file for a first network device in the difference network configuration based on the difference network configuration, the network change case application template, and the first configuration file template; and
instructions for storing the first device configuration file in a first storage device.

25. A system for network configuration management, the method comprising:
a configuration difference module configured to generate a difference network configuration for a managed network based on a current network configuration and a proposed network configuration by comparing the current network configuration and the proposed network configuration;
a case identification module configured to identify a network change case based on the difference network configuration and using one or more network change case identification templates by matching a role in the difference network configuration with a role in a network change case identification template of the one or more network change case identification templates and determining the network change case based on the role match;
a case application module configured to select a network change case application template from one or more network change case application templates based on the identified network change case;
a configuration file module configured to select a first configuration file template based on the difference network configuration and the network change case application template;
a configuration file generation module configured to generate a first device configuration file for a first network device in the difference network configuration based on the difference network configuration, the network change case application template, and the first configuration file template; and
a first storage device configured to store the first device configuration file.

26. The system of claim 25, further comprising a communication module configured to transmit the first device configuration file to the first network device.

27. The system of claim 25, further comprising:
the configuration file module further configured to select a second configuration file template based on the difference network configuration and the network change case application template;
the configuration file generation module further configured to generate a second device configuration file for a second network device in the difference network configuration based on the difference network configuration, the network change case application template, and the second configuration file template; and
a second storage device configured to store the second device configuration.

28. The system of claim 27, further comprising the communication module further configured to transmit the second device configuration file to the second network device.

29. The system of claim 27, further comprising:
the case application module further configured to determine a transmission sequence for the first device configuration file and the second device configuration file based on the network change case application template; and
a communication module configured to:
transmit the first device configuration file to the first network device based on the transmission sequence, and
transmit the second configuration file to the second network device based on the transmission sequence.

30. The system of claim 25, further comprising the configuration file module further configured to select the first configuration file template based on the difference network configuration, the network change case application template, and the first network device in the difference network configuration.

31. The system of claim 25, further comprising the case application module further configured to:
identify one or more sets of one or more network devices in the difference network configuration; and
determine a type from a set of types for each of the sets of one or more network devices identified in the difference network configuration.

32. The system of claim 31, further comprising the case application module further configured to:
determine if each of the sets of one or more network devices is complete based on the type; and
modify the proposed network configuration based on the determination if each of the sets of one or more network elements is complete and one or more network configuration rules.

33. The system of claim 25, further comprising:
a current configuration module configured to determine the current network configuration from a current configuration storage device; and
a proposed configuration module configured to determine the proposed network configuration from a proposed configuration storage device.

34. The system of claim 25, further comprising the configuration file generation module further configured to generate the first device configuration file for the first network device in the difference network configuration based on the difference network configuration, the network change case application template, the first configuration file template, and the current network configuration.

35. The system of claim 25, further comprising the configuration file generation module further configured to:

determine one or more attributes for the first device configuration file based on the first configuration file template;
determine one or more values for each of the one or more attributes based on the difference network configuration; and
modify the first configuration file template with the values of the one or more attributes.

36. The system of claim 25, further comprising the difference configuration module further configured to normalize the difference network configuration based on the one or more network change case identification templates.

37. The system of claim 36, further comprising the difference configuration module further configured to modify the difference network configuration based on one or more network configuration rules.

38. The system of claim 37, further comprising a network configuration management system configured to store the one or more network configuration rules.

39. The system of claim 25, further comprising the case identification module further configured to:
determine if the network change case is identified from the difference network configuration; and
modify the proposed network configuration based on the determination if the network change case is identified and one or more network configuration rules.

40. The system of claim 25, further comprising:
the case identification module further configured to determine if one or more network change cases are identified from the difference network configuration; and
a communication module configured to transmit a configuration error notification based on the determination if the network change case is identified.

41. The system of claim 25, further comprising a proposed configuration module configured to generate the proposed network configuration based on a plurality of configuration change requests.

* * * * *